(12) United States Patent
Gatti et al.

(10) Patent No.: US 9,258,148 B2
(45) Date of Patent: Feb. 9, 2016

(54) METHOD FOR CHANNEL ESTIMATION, RELATED CHANNEL ESTIMATOR, RECEIVER, AND COMPUTER PROGRAM PRODUCT

(75) Inventors: Devis Gatti, Vigevano Pavia (IT); Alessandro Tomasoni, Lesmo Mi (IT); Sandro Bellini, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 145 days.

(21) Appl. No.: 13/611,911

(22) Filed: Sep. 12, 2012

(65) Prior Publication Data

US 2013/0064313 A1    Mar. 14, 2013

(30) Foreign Application Priority Data

Sep. 12, 2011    (IT) .............................. TO2011A0808

(51) Int. Cl.
*H04L 27/06* (2006.01)
*H04L 25/02* (2006.01)
*H04L 25/03* (2006.01)

(52) U.S. Cl.
CPC .......... *H04L 25/0204* (2013.01); *H04L 25/022* (2013.01); *H04L 25/0212* (2013.01); *H04L 25/0232* (2013.01); *H04L 25/0242* (2013.01); *H04L 2025/03617* (2013.01)

(58) Field of Classification Search
CPC .................................................... H04L 25/067
USPC ........................................................ 375/340
See application file for complete search history.

(56) References Cited

U.S. PATENT DOCUMENTS 8,229,011 B2 *   7/2012   Xu ................................ 375/260

OTHER PUBLICATIONS

LAN/MAN Standards Committee of the IEEE Computer Society, "Part 11: Wireless LAN Medium Access Control (MAC) and Physical Layer (PHY) specifications: High-speed Physical Layer in the 5 Ghz Band", IEEE Std. 802.11a; Sep. 1999; 91 pages.
Ye (Geoffrey) Li, Nambirajan Seshadri, and Sirikiat Ariyavisitakul, "Channel Estimation for OFDM Systems with Transmitter Diversity in Mobile Wireless Channels", IEEE Journal on Selected Areas in Communications, vol. 17, No. 3, Mar. 1999, 11 pages.

(Continued)

*Primary Examiner* — Lihong Yu
(74) *Attorney, Agent, or Firm* — Seed IP Law Group PLLC

(57) ABSTRACT

An embodiment of a method for channel estimation for an Orthogonal Frequency Division Multiplexing communication system, including estimating a Time Domain Least Squares channel impulse response having a given maximum number of L taps based on a channel covariance matrix Q, and for each tap l=1, ..., L a respective channel impulse response in the time-domain $\hat{h}_l$, wherein the channel impulse responses in the time-domain are grouped as a channel impulse response vector in the time domain $\hat{h}$. Specifically, an updated channel-impulse-response vector in the time domain $\hat{h}$ is determined by computing for each tap l the solution of the following system: $Q_{1:l,1:l}\hat{h}_{l\times 1}=\hat{h}_{1:l}$, wherein the updated channel-impulse-response vector in the time domain $\hat{h}$ is computed recursively via a Levinson Durbin algorithm.

8 Claims, 7 Drawing Sheets

(56) References Cited

OTHER PUBLICATIONS

Jan-Jaap van de Beek, Ove Edfors, Magnus Sandell, Sarah Kate Wilson, Per Ola Borjesson, "On Channel Estimation in OFDM Systems", Proceedings of IEEE Vehicular Technology Conference, vol. 2, Chicago, IL, Jul. 1995, pp. 815-819.

Klaus Witrisal, "On Estimating the RMS Delay Spread from the Frequency-Domain Level Crossing Rate", IEEE Communications Letters, vol. 5, No. 7, Jul. 2001, pp. 287-289.

Min Jia, Zhen-Yong Wang, and Xue-Mai Gu, "Joint Time domain channel and channel length estimation for OFDM system", Proceedings of IEEE Pacific Rim Conference on Communications, Computers and Signal Processing, Victoria, BC, Aug. 2007, pp. 605-608.

Hirotogu Akaike, "A New Look at the Statistical Model Identification", IEEE Transactions on Automatic Control, vol. 19, No. 6, Dec. 1974, pp. 716-723.

Erik G. Larsson, Guoqing Liu, Jian Li, and Georgios B. Giannakis, "Joint Symbol Timing and Channel Estimation for OFDM Based WLANs", IEEE Communications Letters, vol. 5, No. 8, Aug. 2001, pp. 325-327.

Joseph E. Cavanaugh, "Unifying the Derivations for the Akaike and Corrected Akaike Information Criteria", Statistics & Probability Letters, vol. 33, No. 2, Apr. 1997, pp. 201-208.

Liang Wang, and Gaetan A. Libert, "Combining Pattern Recognition Techniques with Akaike's Information Criteria for Identifying ARMA Models", IEEE Transactions on Signal Processing, vol. 42, No. 6, Jun. 1994, pp. 1388-1396.

Emiliano Dall'Anese, Antonio Assalini, and Silvano Pupolin, "On Reduced-Rank Channel Estimation and Prediction for OFDM-Based Systems", Proceedings of Wireless Personal Multimedia Communications, Jaipur, India, Dec. 2007, 5 pages.

Mehmet Kemal Ozdemir, and Huseyin Arslan, "Channel Estimation for Wireless OFDM Systems", IEEE Communications Surveys & Tutorials, vol. 9, No. 2, Jul. 2007, pp. 18-48.

Norman Levinson, "The Wiener RMS error criterion in filter design and prediction", Journal of Mathematics and Physics, vol. 25, No. 4, pp. 261-278, 1947.

Search Report for Italian Application No. TO20110808, Ministero dello Sviluppo Economico, The Hague, May 10, 2012, 3 pages.

Rosati S. et al: "OFDM Channel Estimation with Optimal Threshold-Based Selection of CIR Samples". Global Telecommunications Conference, GLOBECOM 2009. IEEE. Piscataway, NJ. Nov. 30, 2009, 7 pages.

Farzad Foroughi et al: "Channel estimation for a mobile terminal in a multi-standard environment (LTE and DVB-H)", . ICSPCS 2009. 3rd International Conference on Signal Processing and Communication Systems, IEEE, Piscataway, NJ, Sep. 28, 2009, 9 pages.

Giacomo Bacci et al: "Code-aided iterative channel estimation for OFDM signals with non-binary LDPC codes", 2010 Future Network & Mobile Summit Jun. 16-18, IEEE Piscataway, NJ, Jun. 16, 2010, 8 pages.

Michele Morelli et al: "A Comparison of Pilot-Aided Channel Estimation Methods for OFDM Systems". IEEE Transactions on Signal Processing. IEEE Service Center. New York, NY. vol. 49. No. 12, 9 pages.

* cited by examiner

METHOD FOR CHANNEL ESTIMATION, RELATED CHANNEL ESTIMATOR, RECEIVER, AND COMPUTER PROGRAM PRODUCT

PRIORITY CLAIM

The instant application claims priority to Italian Patent Application No. TO2011A000808, filed Sep. 12, 2011, which application is incorporated herein by reference in its entirety.

TECHNICAL FIELD

An embodiment relates to wireless communication technology, and, more specifically, to systems for estimating the channel impulse response in Orthogonal Frequency Division Multiplexing (OFDM) systems experiencing fading channels. In another embodiment, the channel length also can be estimated jointly with the channel impulse response.

BACKGROUND

Throughout this description, various publications are cited as representative of related art. For the sake of simplicity, these documents will be referred by reference numbers enclosed in square brackets, e.g., [x]. A complete list of these publications, ordered according to the reference numbers, is reproduced in the section entitled "List of references" at the end of the description. These publications are incorporated herein by reference.

In digital transmission systems, one technique to transmit source bits is to group them into complex symbols representing the amplitude and phase of the signal modulating a frequency carrier. Quadrature Amplitude Modulation (QAM) and Phase Shift Keying (PSK) are exemplary modulation schemes.

Generally, the QAM (or PSK) complex symbols are associated with m binary bits, and the way the bits are associated to the $S=2^m$ complex symbols is called "mapping", while the set of symbols is called a "constellation".

For example, Quadrature Phase Shift Keying (QPSK) refers to four complex symbols that can be represented by the two bits 00, 01, 10, 11 respectively. In this context, Gray mapping is a well-known exemplary technique wherein two adjacent complex symbols represent group of bits differing by only one bit.

Complex symbols can be graphically represented in the complex plane where the two axes represent the in-phase (I) and quadrature-phase (Q) components of the complex symbol. For example, FIG. 1 illustrates an example QPSK constellation, wherein the four constellation symbols are denoted 00 to 03. The corresponding Gray-mapped pairs of bits are indicated in blocks 04 to 07. A possible received symbol 08 is also shown, which does not coincide with any transmit symbol due to the effect of noise and distortion caused by the channel.

Digital data (bits or symbols) are transmitted through physical channels that normally corrupt them because of additive noise. Moreover, in wireless systems, the fading communication channel imposes distortion (i.e., phase and amplitude changes). For these reasons, the received data typically do not coincide with the transmitted ones, and a technique, such as an equalization technique, is required to estimate the transmitted data. Normally, the channel coefficients are estimated prior to such equalization and assumed known by the equalizer. The robustness of a transmission link depends on the ability of the receiver to reliably detect the transmitted bits (i.e., transmitted 1s as 1s and transmitted 0s as 0s).

Signal reflections and diffractions can result in multiple copies of the transmitted signal at the receiver, i.e., multi-path effects. Typically, each of these multi-path components will be characterized by a different phase and magnitude associated with the channel.

For example, the discrete time-domain Channel Impulse Response (CIR), and its associated Power Delay Profile (PDP), represents each multi-path contribution as a time-domain tap. Each tap is typically represented as a complex value whose magnitude represents the associated level of intensity, and the angle a phase rotation, of its contribution to the overall received signal. Moreover, the delay spread of the channel is the delay between the arrival of the first and last multi-path contributions in the PDP. Often used is a single value, which accounts for each multi-path contribution, a root-mean square (rms) delay spread, which measures the delay dispersion around its mean value. The signal will likely be distorted by channels characterized by a higher rms delay spread.

Moreover, in the digital domain, an alternative practical parameter to characterize the channel in the time domain is the channel length (CL), i.e., the number of relevant channel taps.

Time-domain multi-path effects may have a dual representation in the frequency domain, where they determine the level of "frequency selectivity" of the channel, measured through the coherence bandwidth, inversely proportional to the delay spread, which represents a frequency band where the channel frequency-response amplitude assumes almost a constant value.

A popular wireless modulation technique is represented by orthogonal frequency division multiplexing (OFDM). OFDM systems correspond to dividing the overall information stream to be transmitted into many lower-data-rate streams, each one modulating a different "sub-carrier" of the main frequency carrier. Equivalently, the overall bandwidth is divided into many sub-bands respectively centered on the sub-carriers. This operation makes data communication more robust via a wireless multi-path fading channel, and simplifies frequency equalization operations. OFDM systems are well known to those skilled in the art. Examples of popular OFDM-based wireless communication systems include, though not limited to, the Wireless Local Area Network (WLAN) standardized by IEEE as "802.11a" [1] and others like "WiMax" for fixed wireless access, "LTE" (long-term evolution) for next-generation cellular communications, etc.

State-of-the-art channel-estimation (CE) methods for OFDM systems may be classified in several ways, such as (see [2], [3]):

Frequency or Time Domain: Channel-estimation techniques in the frequency domain (FD) are usually simpler, since they can be applied to small groups of sub-carriers, or independently subcarrier by subcarrier; on the other hand, time domain (TD) CE typically aims to minimize the mean-square error by a proper weighting of the channel impulse response (CIR), on the basis of some additional information, such as the delay spread or the PDP values. FD CEs are usually performed by a Zero Forcing (ZF) technique applied to each tone, while TD CEs may be based on a Maximum Likelihood (ML) criterion.

Pilot or Data Aided: "Pilots" denote training symbols, known at both the transmitter and receiver sides and usually inserted into the preamble or within the data payload at some subcarrier indexes for the purpose of synchronization or CE [2]. For what concern CE, training symbols are usually placed into Long Training Fields (LTFs) and this scheme will be referred as Pilot-Assisted Channel Estimation (PACE). As an example, systems [1] use two OFDM modulated LTFs (denoted in this document as LTF1 and LTF2). The class of Data-Aided CE algorithms exploits decoded data symbols as if they were known pilots, in order to refine previous channel estimates and track channel variations (induced for example by Doppler effect). These schemes will be referred as Data-Aided Channel Estimation (DACE) algorithms.

SUMMARY

An embodiment of the present description deals with a reduced-rank time-domain least-squares channel estimation (RR TD LS CE) method, able to perform high-performance channel estimation (CE), with the same computational complexity as the state-of-the-art, but with lower memory requirements. Besides, various embodiments of this description deal with joint low-complexity RR TD LS CE and channel-length estimation (CLE).

One or more embodiments include, a method, a corresponding apparatus (a channel estimator and a related receiver), as well as a corresponding related computer-program product, loadable in the memory of at least one computer and including software-code portions for performing the steps of the method when the product is run on a computer. As used herein, reference to such a computer-program product is intended to be equivalent to reference to a computer-readable medium containing instructions for controlling a computer system to coordinate the performance of a method. Reference to "at least one computer" is intended to highlight the possibility for an embodiment to be implemented in a distributed/modular fashion.

As mentioned in the foregoing, the purpose of the present description is to provide embodiments of techniques for estimating the channel in OFDM systems. Moreover, if needed, it is possible to perform jointly channel-impulse-response (CIR) estimation and channel-length estimation (CLE).

Various embodiments of the present description deal with arrangements able to perform a high-performance RR TD LS CE (or "channel smoothing") at the same complexity as the state of the art, but with a lower memory burden.

Moreover various embodiments deal with arrangements able to perform joint CE and CL estimation at the same time, thus possibly adding relatively little extra complexity compared to CE alone, yet providing accurate length estimates, which can be used in turn to improve the CE output accuracy.

For example, key features of various embodiments disclosed herein include:

Low-complexity recursive computation of RR TD LS CE employing the Levinson Durbin (LD) algorithm. Specifically, an embodiment has the same complexity as the classical RR TD LS with constant $L_{ch}=L_{cp}+1$, where $L_{cp}$ denotes the number of samples used for the cyclic prefix extension of the OFDM symbols, but the CIRs associated with intermediate $L_{ch}=1, \ldots, L_{cp}+1$ are by-products of the solution, and as such it proves to be very advantageous for hardware complexity if all the CIRs are used to estimate the CL, as explained in the following;

A novel efficient implementation of joint CE and CLE via Akaike Information Criterion (AIC). As described later in more detail, AIC-based state-of-the-art CLE implementations often require computing multiple RR TD LS CIR instances for all intermediate $L_{ch}=1, \ldots L_{cp}+1$. The use of the LD algorithm allows one to re-use the intermediate by-products of the biggest size problem ($L_{cp}$) to solve also the problems associated with lower l values. This way CLE comes at the expense of low extra complexity compared to CE itself.

The recursive growth of a model with AIC identification is a topic already investigated in the literature, and applied, e.g., to Auto-Regressive Moving-Average (ARMA) filters for time series modeling [10]. Conversely, the present description deals also with embodiments able to efficiently update the AIC metric by means of the by-products of the same LD algorithm also used to compute the RR TD LS CE.

Various embodiments deal with a novel solution to perform RR TD LS CE employing the Levinson Durbin (LD) algorithm [9]. However, it is understood that other recursive algorithms instead of LD might be used in other embodiments.

Various embodiments deal with CLE through a novel efficient implementation of the AIC criterion.

Various embodiments deal with joint CE and CLE based on AIC, wherein the LD algorithm allows a low-complexity computation of the AIC metrics associated with the CIR estimates for all intermediate $L_{ch}=1, \ldots, L_{cp}+1$.

BRIEF DESCRIPTION OF THE DRAWINGS

One or more embodiments are now described with reference to the annexed drawings, which are provided purely by way of non-limiting example and in which:

FIGS. 3-8b illustrate various aspects of the channel estimator in accordance with an embodiment.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
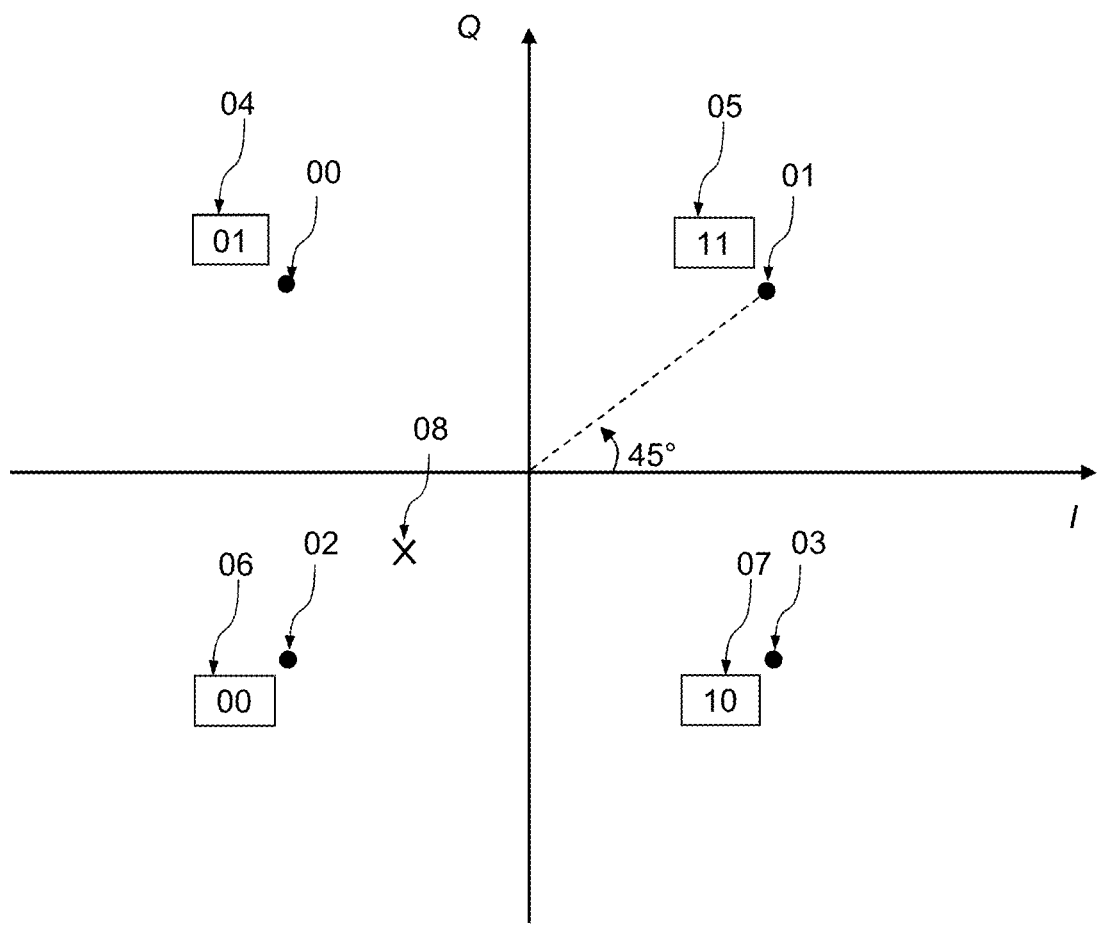
FIG. 1 illustrates an example of a QAM constellation, namely a 4-QAM or QPSK, bit mapping, and possible received symbol.
Figure 2:
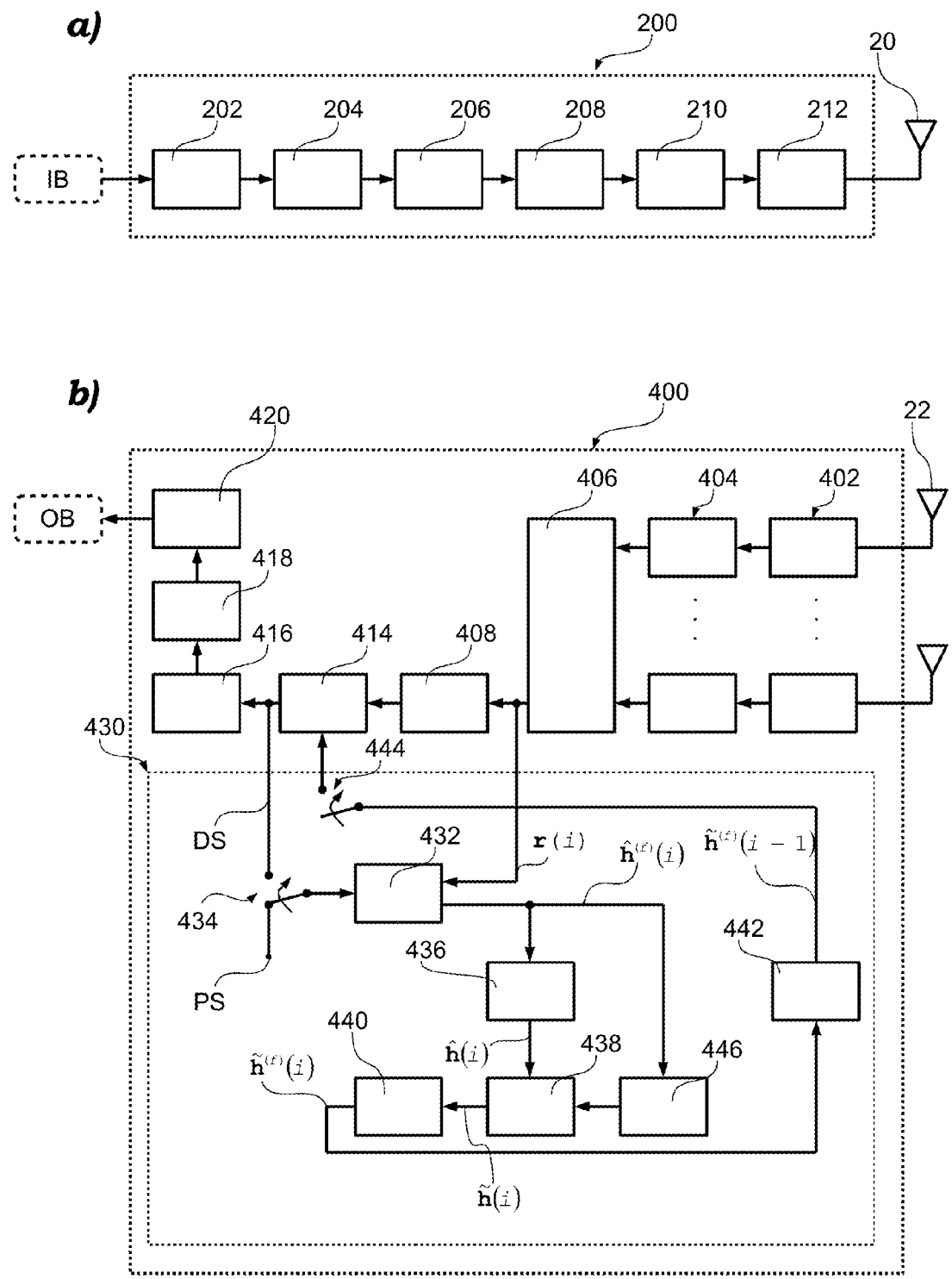
FIGS. 2a and 2b illustrate respectively a OFDM transmitter and a OFDM related receiver according to an embodiment.

FIGS. 2a and 2b show respectively possible embodiments of an OFDM transmitter and receiver. Specifically, with reference to [1], FIG. 2 illustrates an example of an FEC coded OFDM transmitter and receiver, which may be used, e.g., in the context of a Wireless Fidelity (WiFi) transmission scheme, wherein source bits IB including a Physical Layer Convergence Protocol (PLCP) Header and PLCP service data unit (PSDU) (i.e., a data block) are transmitted using at least one transmitting antenna 20 and are received using at least one receiving antenna 22.

In the example considered, typical transmitter baseband digital procedures are grouped as 200. For example, blocks 202 to 206 may refer to coding/mapping operations made on the PLCP-Header and PLCP service data unit (PSDU). Blocks from 208 to 212 instead may act upon the overall PLCP, including also the PLCP Preamble.

The block 200 may be conventional, and may include a Forward Error Correction (FEC) encoder 202, an interleaver 204, a bit-to-complex-constellation mapper 206, a framing and OFDM modulator (and Guard Interval (GI) insertion) block 208, a filter block 210, and digital-to-analog (D/A) converters 212 to convert an input bit stream IB for transmission over a transmitting antenna 20.

As a counterpart, block 400 represents typical baseband elements of a receiver coupled to, e.g., two receiving antennas. In particular, block 400 includes analog-to-digital (A/D) converters 402 and filter blocks 404 for each of the antennas 22 of the receiver.

A typical receiver may further include a conventional synchronization block 406 and an (GI removal and) OFDM demodulator block 408, which provides the received data vector r(i).

Moreover, block 400 may include, as distinguishable units, a channel equalizer 414, a bit demapper and log-likelihood ratios (LLR) calculator block 416, a deinterleaver 418, and a FEC decoder 420, which provides the final output bit stream OB.

Generally, any FEC code might be used in the FEC encoder 202 and FEC decoder 420, such as BCH (Bose and Ray-Chaudhuri), Reed-Solomon, convolutional, low-density parity-check code, and turbo-encoding/decoding schemes.

Moreover, the presence of the interleaver and deinterleaver blocks is optional in the sense that they may not be present in a general OFDM transmission-scheme architecture. Usually, the deinterleaver 418 implements the reciprocal permutation law of the interleaver 204.

Again, these embodiments are for illustration only, and other embodiments of the transmitting and receiving systems 200 and 400 may be used without departing from the scope of this disclosure.

In order to enable coherent communication between the transmitter and the receiver, a common practical strategy is to estimate the channel effects at the receiver side with a channel estimator 430. Typically, the receiver performs effective and low-complexity channel estimation (CE), since battery life and chip area are scarce resources in wireless devices.

For example, with respect to FIG. 2b, the channel estimator 430 may receive initially the reference pilot symbol PS and the received vector r(i) at the time instant i in order to perform a Pilot Assisted Channel Estimation and to determine channel estimates in the frequency domain $\hat{h}^{(f)}(i)$. Subsequently, the channel estimator 430 may perform a Data Aided Channel Estimation by selecting (e.g., via a switch 434) the decoded data symbol DS as a reference symbol to generate an updated version of the channel estimates in the frequency domain $\hat{h}^{(f)}(i-1)$ for the next cycle to be used by the equalizer 414 during the Data Aided Channel Estimation scheme activated, e.g., via a switch 444.

As mentioned in the foregoing, TD algorithms may provide more accurate CE than FD ones though being more complex. Accordingly, it may be desirable to optimize the overall complexity to cope with realistic hardware (HW) capabilities.

For example, with respect to FIG. 2b, a practical approach to the problem may be to split the time-domain CE process in two steps [3]:

a) a Frequency Domain Zero Forcing CE (FD ZF CE) may first be performed by a "tone-by-tone" estimator 432 in order to generate the channel estimates $\hat{h}^{(f)}(i)$;

b) the FD CE is then transformed to TD, for example by generating channel estimates in the time domain $\hat{h}(i)$ via an Inverse Discrete Fourier Transform (IDFT) at a block 436 and a Least Squares (LS) estimator is applied to the number of relevant taps (or channel length, CL) of the TD CIR at a block 438 in order to generate updated channel estimates in the time domain $\tilde{h}(i)$.

Accordingly, the blocks 432 and 436 calculate for each tap l a respective channel impulse response in the time-domain $\hat{h}_l$, which are grouped as a channel-impulse-response vector in the time domain $\hat{h}$.

Such TD processing allows reducing the mean square error (MSE) of the CE by filtering out the noise contributions over non-relevant channel taps, and is also referred to as reduced-rank (RR) TD LS CE, or, more informally, "channel smoothing".

Accordingly, in the remainder of the present description both denominations will be used alternatively being intended that:

channel smoothing is equivalent to RR TD LS CE, according to the details described in the remainder of the present document;

"channel smoother" is a method or apparatus computing and implementing a "channel smoothing" algorithm or RR TD LS CE, according to the details described in the remainder of the present document.

As a last step of an example TD LS CE method, the updated channel estimates in the time domain $\tilde{h}(i)$ at the output of the block 438 are eventually transformed back to FD at a Discrete Fourier Transform (DFT) block 440 as may be required by OFDM receivers for demodulation purposes in order to generate and update channel estimates in the frequency domain $\tilde{h}^{(f)}(i)$. These channel estimates $\tilde{h}^{(f)}(i)$ are then delayed, e.g., by a buffer or memory 442, in order to provide the updated channel estimates $\tilde{h}^{(f)}(i-1)$ for the next cycle. As shown in FIG. 2b, the channel smoother 438 may also have associated therewith a channel-smoother set-up block 446, which provides at least one configuration parameter for the block 438. For example, in FIG. 2b the block 446 determines its setup-parameters as a function of the current channel estimates $\hat{h}^{(f)}(i)$ provided by the FD CE block 432.

Channel-smoothing methods may require the knowledge of the CL ($L_{ch}$) at the receiver. A possible workaround is to set $L_{ch}$ to a constant value. On the other hand, it is clear that for possibly shorter channels accurate channel-length estimation (CLE) would represent an added value for the overall system performance. Several CLE algorithms exist in literature. They can operate either in FD or TD. FD estimators base their outputs on some specific property of the estimated channel frequency response (such as the zero-level crossing rate [4]); they are characterized by low complexity, but, at best, do not exploit the information about the CL (carried by the received signal), and, therefore, may require several OFDM symbols to provide reliable estimates. TD estimators usually rely on a given CIR energy threshold level [5]: only the channel-tap estimates exceeding the threshold are retained at the receiver for further processing. A main drawback of this class of algorithms lies in their sensitivities to the threshold level, which is arbitrary.

More accurate results are achieved by using the Akaike Information Criterion (AIC) [6], [7] and its derivations, such as the corrected AIC (AICc) [8]. AIC estimator motivations arise from information theory, as a result of the problem of minimizing the information lost by the channel estimator. Despite its remarkable performance, so far AIC has not been suitable for practical receiver implementations for OFDM systems as they have to deal with virtual sub-carriers (i.e., unused OFDM sub-carriers), and this fact brings a significant complexity burden, as clarified in detail in the remainder of the present document. Indeed, a straight implementation would most likely require computing channel smoothing (involving FD-TD-FD passages and square-magnitude computations) repeatedly.

In an embodiment considered, the CLE and CE smoother 438 receives as input $\hat{h}(i)$, that is the TD representation of the FD CE $\hat{h}^{(f)}(i)$ (where $\hat{h}$ is a N×1 vector of OFDM symbol tones and i refers to i-th OFDM symbol to be processed). These channel estimates may be computed differently depending on the considered CE class (PACE or DACE). For example, when the initial preamble is being processed, the i-th FD CE $\hat{h}^{(f)}(i)$ may be computed based on the pilot symbols PS, as specified, e.g., in [1].

According to the DACE class of CE techniques, starting from the first data (or information payload) OFDM symbol onwards, the i-th CE can be updated through the following steps:

- the previously stored (i−1)-th CE instance is used to perform soft estimates of the QAM transmitted data symbols by means of the equalizer 414;
- a sequence of estimated data constellation symbols DS can be determined directly through hard detection of said soft estimates or, by passing them to the FEC decoding chain 416 to 420;
- the estimated data sequence DS replaces the function of the initial training sequence to compute a RR TD LS CIR $\hat{h}(i)$ (by block 438) and the updated FD CE is at last computed by FD transform to $\hat{h}^{(f)}(i)$.
- the output CE is then stored in a dedicated memory 442 and used by the channel equalizer 414 to determine the transmitted constellation symbol estimates at the next (i+1)-th OFDM symbol.

Several OFDM CE methods are known in the literature [11], [12], [13]. Some of these methods improve performance by exploiting the knowledge of an estimate of the CIR length, and are referred to as "reduced rank" (RR) methods. However the DD technique described herein can be applied to either reduced-rank or full-rank CE methods.

Generally, the following description will refer to an OFDM system characterized by the following parameters:

- a total bandwidth B;
- N sub-carriers per OFDM symbol;
- $L_{cp}$ number of samples used for the cyclic prefix extension of an OFDM symbol;
- $T_c=1/B$ is the channel sampling time;
- $\Delta f_c=B/N$ is the frequency spacing between the sub-carriers; and
- $T=(N+L_{cp})T_c$ is the duration of an OFDM symbol.

In various embodiments, the point-to-point multi-path wireless link is modeled using the well-known time-varying discrete wide-sense stationary-uncorrelated scattering (WSS-US) channel model, where the time-domain CIR has $T_c$ spaced taps as:

$$h(kT, nT_c) = \sum_{l=0}^{L_{ch}-1} h_l(kT)\delta(nT_c - lT_c) \quad (1)$$

where $L_{ch}$ is the number of significant taps at time instant kT.

Generally, in OFDM systems, blocks of N complex symbols are transmitted in parallel over N distinct sub-channels, where each complex symbol belongs to a generic (PSK or QAM) complex constellation.

In the remainder of the document:

- the time index k may be omitted for notation simplicity;
- the OFDM symbol index i may also be omitted for notation simplicity and will be used explicitly when multiple OFDM symbols must be addressed;
- when a vector or matrix size could be ambiguous, it will be explicitly reported in the subscripts associated with the vector or matrix,
- the matrixes O and I represent respectively a zero matrix and an identity matrix;
- the operation $x_{1:l,\ 1:l}^{-1}$ does not correspond to $(x^{-1})_{1:l,\ 1:l}$, because in the former case, the submatrix is extracted before the inversion, vice-versa in the latter case.

In various embodiments, a cyclic prefix (or guard interval) of extension $L_{cp}$ is pre-appended to each modulated OFDM symbol. The matrix associated with the (normalized) Inverse Discrete Fourier Transform (I-DFT) can be written in compact form as:

$$W \in C^{N \times N} : w_{h,k} = \frac{1}{\sqrt{N}} \exp\left(j2\pi \frac{hk}{N}\right) \quad (2)$$

where the following property holds:

$$W^H W = W W^H = I_{N \times N} \quad (3)$$

Thus, W is orthonormal and $W^H$ represents the (normalized) Discrete Fourier Transform (DFT).

Moreover, the diagonal matrix of transmitted data symbols is denoted as:

$$P=\text{diag}([p_0 p_1 \ldots p_{N-1}]) \quad (4)$$

Depending on the context, the sequence $\{p_k\}$ could be a training sequence belonging to a preamble of a packet transmission, or a sequence of estimated transmitted data symbols. Usually, only K out of N subcarriers are active. Some others, such as at the DC and close to the maximum frequency not affected by aliasing (i.e., the Nyquist frequency), may be unused. These unused carriers are called virtual carriers, and their $p_k$ may be set to 0.

For example, in case the CL is l≤N, the frequency-domain channel response (i.e., after a Fourier transform) may be modeled as:

$$h^{(f)} = W^H \begin{bmatrix} h_{l \times 1} \\ 0_{(N-l) \times 1} \end{bmatrix} = W^H \begin{bmatrix} I_{l \times l} \\ 0_{(N-l) \times l} \end{bmatrix} h_{l \times 1} \quad (5)$$

Generally, the transmitted symbols P are distorted by the channel. For example, in various embodiments, after (e.g., perfect) time-frequency synchronization and removal of the cyclic prefix at the receiver, and if, moreover, no ISI is present because l≤$L_{cp}$+1, then the TD received signal may be written as:

$$r_{N\times 1} = WPh^{(f)} + n_{N\times 1} = WPW^H \begin{bmatrix} I_{l\times l} \\ 0_{(N-l)\times l} \end{bmatrix} h_{l\times 1} + n_{N\times 1} \quad (6)$$

where n: $CN(0_{N\times 1}, N_0 I_{N\times N})$ is a Complex Normal (CN) distribution of Additive White Gaussian Noise (AWGN) and $N_0$ is the power spectral density of the noise.

In various embodiments, the channel estimator exploits the received data $r_{N\times 1}$ to estimate the channel estimates $h_{l\times 1}$ for the symbol index i. For example in case of [1], the channel estimator may represent a first long training field $LTF_1$ with a first received vector $r_{N\times 1}(1)$ and second long training field $LTF_2$ with a second received vector $r_{N\times 1}(2)$.

Time-Domain Least-Squares Channel Estimation

As mentioned in the foregoing, an embodiment of the instant description is concerned with TD LS CE, which uses as input a simple tone-by-tone FD CE (ignoring possible sub-carrier correlation) and then refines it, yielding an improved TD output. It can be seen that even this two-phase approach actually coincides with the optimal maximum-likelihood (ML) estimator in case of AWGN noise. In detail, once the received OFDM symbol has been demodulated at the block 408, one can obtain the initial FD CE at the block 414 in (at least) two ways.

In an embodiment, the optimal solution may be provided by the matched filter (MF) $P^H$:

$$\hat{h}^{(f)} = P^H W^H r \quad (7)$$

The TD CIR $\hat{h}$ after the I-DFT at block 436 reads:

$$\hat{h}_{N\times 1} = W\hat{h}^{(f)} \quad (8)$$

$$= WP^H PW^H \begin{bmatrix} I_{l\times l} \\ 0_{(N-l)\times l} \end{bmatrix} h_{l\times 1} + WP^H W^H n$$

$$= Q \begin{bmatrix} I_{l\times l} \\ 0_{(N-l)\times l} \end{bmatrix} h_{l\times 1} + WP^H W^H n$$

where:

$$Q = W(P^H P)W^H \quad (9)$$

is a Toeplitz and Hermitian matrix, and is often denoted as a channel covariance matrix.

Generally, Toeplitz matrices have constant diagonal elements, i.e.

$$Q_{i,j} = Q_{i+k,j+k}, \forall i,j,k,$$

while Hermitian matrices have a complex-conjugate symmetry, i.e.:

$$Q_{i,j} = Q_{j,i}^*, \forall i,j.$$

In one embodiment, the RR smoothed estimate $\tilde{h}l\times 1$ of the actual channel $h_{l\times 1}$ is obtained by inverting the system of equation (6), in a least squares (LS) sense. For example, for a given CL l, the LS problem may be solved by the Moore-Penrose pseudo-inverse:

$$\tilde{h}_{l\times 1} = \left( [I_{l\times l}\ 0_{l\times(N-l)}]WP^H PW^H \begin{bmatrix} I_{l\times l} \\ 0_{(N-l)\times l} \end{bmatrix} \right)^{-1} \quad (10)$$

$$[I_{l\times l}\ 0_{l\times(N-l)}]WP^H W^H r_{N\times 1}$$

$$= \left( [I_{l\times l}\ 0_{l\times(N-l)}]Q \begin{bmatrix} I_{l\times l} \\ 0_{(N-l)\times l} \end{bmatrix} \right)^{-1} [I_{l\times l}\ 0_{l\times(N-l)}]$$

$$\hat{h}_{N\times 1}$$

and for compactness of notation the following definitions will be used in the remainder of this document:

$$Q_{1:l,1:l} = [I_{l\times l}\ 0_{l\times(N-l)}]Q \begin{bmatrix} I_{l\times l} \\ 0_{(N-l)\times l} \end{bmatrix} \quad (11)$$

$$\hat{h}_{1:l} = [I_{l\times l}\ 0_{l\times(N-l)}]\hat{h}_{N\times 1} \quad (12)$$

Thus, the channel estimation problem may be written as $$\tilde{h}_{l\times 1} = Q_{1:l,1:l}^{-1}\hat{h}_{1:l} \quad (13)$$

where $$\tilde{h}_{l\times 1}: CN(h, N_0 Q_{1:l,1:l}^{-1}).$$

A special case (yet very common, e.g., in PACE for systems as shown, e.g., in [1]) arises when all the non-null elements of P have the same norm, i.e., when pilot symbols $p_k$ come from a PSK constellation. In this case, assuming, without loss of generality, unit energy transmitted symbols:

$$P^H P = A = \text{diag}([I(|p_0|>0)I(|p_1|>0)\ldots I(|p_{N-1}|>0)]) \quad (14)$$

regardless of the specific value of any $p_k$, where $i(\cdot)$ is the indicator function.

A straight consequence would be that the channel covariance matrix Q becomes constant:

$$Q = WAW^H \quad (15)$$

and may not be recomputed when pilots change, thus avoiding many real-time computations.

A sub-optimal approach, yet attractive for its reduced complexity, is the adoption in equation (13) of the constant Q of equation (15) also when pilots $p_k$ belong to QAM constellation (such as 16-QAM). This can be done provided that the initial FD MF CE as shown in equation (7) is replaced by FD ZF CE, which basically zeroes the noise in correspondence to the virtual carriers and inverts the effect of the pilots transmitted over data carriers:

$$\hat{h}^{(f)} = \breve{P}W^H r_{N\times 1} \quad (16)$$

where $$\breve{P}_{k,k} = \begin{cases} \dfrac{1}{p_k} & \text{if } p_k > 0 \\ 0 & \text{if } p_k = 0 \end{cases} \quad (17)$$

Furthermore, it can be shown that when the position of the active carriers is symmetric with respect to DC (as it happens for example using the training sequences specified in [1] and its derivatives) and their energy is uniform (such as for PSK symbols), Q is real, thus the algorithm complexity can be almost halved.

Accordingly, in various embodiments, reference will be made primarily to the constant Q case (by definition or forced to be, e.g., through FD ZF CE). Nevertheless, it is understood that an embodiment is valid also for the general case of non-uniform energy constellation symbols (such as M-QAM) and in the case of complex, time-varying Toeplitz matrices, to be considered to guarantee the optimal TD LS solution (i.e., characterized by lower MSE) of equation (8). In the following will be pointed out also possible differences among solutions, along with their advantages and disadvantages.

In various embodiments, more than one training OFDM symbol is available for CE, thus permitting to improve the final estimation, e.g., by averaging the partial estimates. For example, if the training-based estimates were two, as for [1]:

$$\hat{h} = \frac{\hat{h}(1) + \hat{h}(2)}{2} \quad (18)$$

$$\tilde{h} = \frac{\tilde{h}(1) + \tilde{h}(2)}{2} \quad (19)$$

In fact, there is no need to compute RR TD LS with two different inputs and eventually averaging the outputs, because, due to the linear property of the operators, TD LS CE can be applied equivalently once to the average of the initial training-based CEs:

$$\tilde{h} = Q_{1:l,1:l}^{-1}\left(\frac{\hat{h}_{1:l}(1) + \hat{h}_{1:l}(2)}{2}\right) = Q_{1:l,1:l}^{-1}\hat{h}_{1:l} \quad (20)$$

For example, in various embodiments, the above average shown in equation (18) is replaced by an equivalent average of $\tilde{h}^{(f)}(1)$ and $\tilde{h}^{(f)}(2)$ in the frequency domain, once again thanks to linearity, thus permitting to perform just one I-DFT computation rather than two.

Channel Length Estimation Via the Akaike Information Criterion.

Generally speaking, AIC is a criterion employed to choose among a (finite) set of models; a preferred model may be the one that better describes a given sequence of observations. From an information-theoretical perspective, the best model minimizes the information loss. If applied to the CLE problem, AIC chooses among different smoothed channels, i.e., out of a set of CL possible values. This way, AIC can provide accurate CLE [6], [7]. Yet, it suffers from high complexity.

In case of CLE, AIC attempts to find a good trade-off between the variance of the output RR TD LS CE from the input FD CE, and the number of parameters required to achieve it.

For example, the CL estimate $\hat{l}$ may be the solution of the minimization problem:

$$\hat{l} = \arg\min_{1 \leq l \leq L_{cp}+1} AIC(l) \quad (21)$$

For example, in case of systems [1], the AIC metric as a function of the CL l may be given by:

$$AIC(l) = \ln\left(\frac{\sigma_l^2(1) + \sigma_l^2(2)}{2}\right) + \Psi_l, \quad (22)$$
$$\Psi_l = 0.03\ l$$
with $$\sigma_l^{(2)}(i) = \sum_{k=0}^{N-1} \left| p_k \tilde{h}_k^{(l)(f)} - r_k^{(f)}(i) \right|^2 \quad (23)$$

In the embodiments considered, the coefficient 0.03 is related to 2/N (where N=64 is the number of OFDM tones in [1]), $\tilde{h}_k^{(l)(f)}$ and $r_k^{(f)}(i)$ are the k-th element of the DFT of the l-tap CIR $\tilde{h}^{(l)}$ and of the i-th received OFDM symbol r(i), respectively.

In various embodiments, the AIC computation problem is faced by splitting it into two separate topics:

1) Computation of multiple terms $\sigma_l^2(i)$ as for equation (23), for every l=1, ..., $L_{cp}$+1. For example, each term would involve:
a) one DFT of $\tilde{h}^{(l)}$ to move to FD;
b) M·N Euclidean distances with input complex values for each length l, where N and M are the number of carriers and training sequences, respectively; thus resulting in a rather prohibitive complexity.

2) Computation of the additive corrective term $\Psi_l$ or "AIC penalty", as a function of the current CL l (equal to 0.03 l in equation (22)).

Main aspects to take into account for that purpose may be:
a) Computation over virtual carriers: equation (23) includes all the frequency domain tones, 0 to N−1, involved in metric computation. In this way, also the unused OFDM tones across the DC and the Nyquist frequency affect the expression in equation (22), leading to useless DFT and metric computations;

b) AIC metric reliability: the results reported in literature show that the AIC metric is biased, i.e., on average, the AIC criterion chooses a model with more parameters than necessary, thus missing the goal of minimizing the information loss. For example, the original criterion [6] is unbiased only asymptotically, for a large number of observations;

c) Logarithm computation: from a hardware implementation perspective, logarithm computation is challenging and often involves the implementation of a dedicated hardware architecture to cope with latency and memory usage.

In the following is described an embodiment, in which the TD LS CE at block 438 is performed via a Levinson-Durbin algorithm.

In the embodiment considered, with reference to equation (13), the proposed TD LS CE 438 computes a Time Domain Least Squares channel impulse response (having a given maximum number of L taps). Specifically, the block 438 receives as input a channel covariance matrix Q (calculated, e.g., according to equation (9) or (15)) and receives (e.g., from the blocks 432 and 436) for each tap l=1, ..., L, a respective channel impulse response in the time-domain $\hat{h}_l$, wherein the channel impulse responses in the time-domain are grouped as a channel impulse response vector in the time domain $\hat{h}$. More specifically, the block 438 computes an updated channel-impulse-response vector in the time domain $\tilde{h}$ by computing for each tap l the solution of the following linear system of equations:

$$Q_{1:l,1:l}\tilde{h}_{l\times 1} = \hat{h}_{1:l} \quad (24)$$

In order to introduce the Levinson-Durbin algorithm from a general perspective, reference is made first to possible solutions for generally computing the system of the following equations:

$$Q_{1:l,1:l}\nu^{(l)} = x_{1:l} \quad (25)$$

A possible solution includes computing:

$$y^{(l)} = Q_{1:l,1:l}^{-1} x_{1:l}.$$

However, it is well known that a matrix inversion of size l in general has a cost of $O(l^3)$ multiplications. Furthermore, if l=1, ..., L, with L=$L_{cp}$+1, and all the corresponding matrix inversions are to be computed, the overall cost would even be $O(L^4)$, which may be unacceptable even for moderate L.

When the matrix Q does not change, i.e., the matrix Q has constant coefficients, and the above system is to be solved many times (i.e., for many input vectors x), a first improvement may be obtained by performing a pre-computation of all possible inverse sub-matrices $Q_{1:l,\ 1:l}^{-1}$ and then computing L matrix-vector multiplications $Q_{1:l,\ 1:l}^{-1} x_{1:l}$ in the run-time process, whose cost is $O(l^2)$ each, thus leading to an overall complexity $O(L^3)$. Nevertheless, this cost may still remain too high, and a memory size too large for the application may be required to store all the inverse-matrix coefficients.

However, in the case of channel estimation, the matrix $Q_{1:l,\ 1:l}$ has a Toeplitz structure, i.e., all the elements over diagonals are equal. Moreover, such a matrix inversion has only a cost of $O(l^2)$ and may be performed via a Levinson-Durbin (LD) algorithm.

In fact, in an embodiment, it has been discovered that the LD algorithm has two remarkable advantages. First of all, the LD algorithm avoids computing the inverse matrix, and directly provides the solution $y^{(l)}$ of the system shown in equation (25). This is done recursively by solving the 1×1 subsystem first, then correcting the result at the previous step to find the solution of the 2×2 system, and so on. This way, the intermediate steps of the algorithm are the exact solutions of the smaller-sized sub-systems embedded within equation (25), with 1≤L, and the overall complexity still remains $O(L^2)$, even if the smoothed channel is computed for every CL hypothesis l.

Furthermore, the size of memory may be reduced. In fact, the storage of the inverse matrices would save $$\sum_{l=1}^{L} l^2 = \frac{L^3}{3} + \frac{L^2}{2} + \frac{L}{6}$$

elements in the memory. The LD algorithm, on the contrary, can save only the first row of $Q_{1:l,1:l}$, and L other vectors of size l (as will be described in the following), thus leading to saving only $$L + \sum_{l=1}^{L} l = \frac{L(L+3)}{2}.$$

elements in memory; therefore, for L>2, using the LD algorithm may use less memory than a technique that includes computing an inverse matrix.

The LD algorithm can be split in two parts. Specifically, the first part corresponds to a core algorithm, to be repeated for every different vector x.

Specifically, in the instant case of channel estimation, the input vector x would be the current channel estimates in the time domain $\hat{h}_{l\times 1}$, i.e., the I-DFT of the FD CE, and the solution y would be the RR TD LS CE of the updated channel estimates in the time domain $\hat{h}_{l\times 1}$, with l being the number of channel taps.

In an embodiment, the core algorithm relies on a set of support vectors b, depending only on Q. For example, under the hypothesis of a constant matrix Q, the computation of vectors b can be done only once, outside of the recursive LD algorithm. Furthermore, in case Q is real, the support vectors b are also real.

In an embodiment, the LD algorithm finds a solution of the system expressed by equation (25) assuming that the solution of the sub-system:

$$Q_{1:l-1,1:l-1} y^{(l-1)} = x_{1:l-1} \tag{26}$$

has already been computed.

In an embodiment, the method augments $y^{(l-1)}$ to the size of the new problem, measures the introduced error, and applies a correction term to find $y^{(l)}$.

For example, in an embodiment, this is achieved by exploiting a set of additional vectors, namely "backward vectors" $b^{(l)}$, such that:

$$Q_{1:l,1:l} b^{(l)} = \begin{bmatrix} 0 \\ \vdots \\ 0 \\ 1 \end{bmatrix} \tag{27}$$

As will be described later, also these vectors can be efficiently computed.

In the embodiment considered, the augmented solution induces an error term in the last position of x:

$$Q_{1:l,1:l} \begin{bmatrix} y^{(l-1)} \\ 0 \end{bmatrix} = \begin{bmatrix} x_{1:l-1} \\ \varepsilon_y^{(l)} \end{bmatrix} \tag{28}$$

where:

$$\varepsilon_y^{(l)} = Q_{l,1:l-1} y^{(l-1)} \tag{29}$$

Thanks to the linear property, the above result can be easily adjusted to be a solution of the l×l system:

$$Q_{1:l,1:l} \left( \begin{bmatrix} y^{(l-1)} \\ 0 \end{bmatrix} + (x_l - \varepsilon_y^{(l)}) b^{(l)} \right) = \begin{bmatrix} x_{1:l-1} \\ \varepsilon_y^{(l)} \end{bmatrix} + \begin{bmatrix} 0 \\ \vdots \\ 0 \\ x_l - \varepsilon_y^{(l)} \end{bmatrix} = x_{1:l} \tag{30}$$

Thus:

$$y^{(l)} = \begin{bmatrix} y^{(l-1)} \\ 0 \end{bmatrix} + (x_l - \varepsilon_y^{(l)}) b^{(l)} \tag{31}$$

In an embodiment, the backward vectors $b^{(l)}$ are computed as follows. Specifically, as mentioned in the foregoing, under the hypothesis of a constant matrix Q, these vectors may be also computed only once per matrix Q, and saved in a memory.

In an embodiment, a set of "forward vectors" $f^{(l)}$ is also used, so that:

$$Q_{1:l,1:l} f^{(l)} = \begin{bmatrix} 1 \\ 0 \\ \vdots \\ 0 \end{bmatrix} \tag{32}$$

These vectors are used only to compute the backward vectors, and, e.g., can be discarded at the end of the pre-processing.

As before, the computation of backward and forward vectors at the l-th iteration augments the results of the (l−1)-th iteration.

For example, in an embodiment, due to linearity, and exploiting the fact that the matrix Q is a Toeplitz matrix:

$$Q_{1:l-1,1:l-1} = Q_{2:l,2:l}$$

therefore, it follows:

$$Q_{1:l,1:l} \left( \alpha \begin{bmatrix} f^{(l-1)} \\ 0 \end{bmatrix} + \beta \begin{bmatrix} 0 \\ b^{(l-1)} \end{bmatrix} \right) = \begin{bmatrix} \alpha + \beta \varepsilon_b^{(l)} \\ 0 \\ \vdots \\ 0 \\ \alpha \varepsilon_f^{(l)} + \beta \end{bmatrix} \tag{33}$$

where:

$$\varepsilon_f^{(l)} = Q_{l,1:l-1} f^{(l-1)} \tag{34}$$

$$\varepsilon_b^{(l)} = Q_{1,2:l} b^{(l-1)} \tag{35}$$

Since the 1–2 central equations in equation (33) are automatically satisfied, it suffices to find the proper coefficients α and β that force to 0 and 1 (in the case of $b^{(l)}$) or to 1 and 0 (in the case of $f^{(l)}$) the first row and the last row of the above system, i.e.:

$$b^{(l)} = \frac{1}{1-\varepsilon_b^{(l)}\varepsilon_f^{(l)}} \begin{bmatrix} 0 \\ b^{(l-1)} \end{bmatrix} - \frac{\varepsilon_b^{(l)}}{1-\varepsilon_b^{(l)}\varepsilon_f^{(l)}} \begin{bmatrix} f^{(l-1)} \\ 0 \end{bmatrix} \quad (36)$$

$$f^{(l)} = \frac{1}{1-\varepsilon_b^{(l)}\varepsilon_f^{(l)}} \begin{bmatrix} f^{(l-1)} \\ 0 \end{bmatrix} - \frac{\varepsilon_f^{(l)}}{1-\varepsilon_b^{(l)}\varepsilon_f^{(l)}} \begin{bmatrix} 0 \\ b^{(l-1)} \end{bmatrix} \quad (37)$$

In an embodiment, the computation of the forward vectors needs to be performed only if Q is not Hermitian (or not symmetric in the case that Q is a real matrix).

Conversely, in the case that Q is Hermitian (or is symmetric if Q is a real matrix), the following relationship between $b^{(l)}$ and $f^{(l)}$ holds:

$$b^{(l)} = (R^{(l)} f^{(l)})^* \quad (38)$$

where R is the matrix which reverses the vector elements.

The complexity of the LD solution described in the foregoing may be expressed in terms of a number of scalar real multiplications, wherein for simplicity, it will be assumed that each complex multiplication costs four real multiplications:

equation (29) costs l–1 complex-real multiplications;
equation (31) costs l complex-real multiplications;
equation (35) costs l–1 real multiplications; and
equation (36) costs 3+2(l–1) real multiplications The last two items refer to the pre-processing (in an embodiment, necessary only in the case of varying Q), so it is worth counting them separately from the variable costs (real multiplications):

$$2\sum_{l=1}^{L}(2l-1) = 4\sum_{l=1}^{L}(l) - 2L = 4\frac{L(L+1)}{2} - 2L = 2L^2$$

and the pre-processing costs (real multiplications):

$$3\sum_{l=1}^{L} l = 3\frac{L(L+1)}{2}$$

If needed, all intermediate RR TD LS CE outputs with l=1, ..., L (as in the case of AIC-based CLE, in order to compute equation (23)) can be obtained as by-products of the LD algorithm applied to the biggest-size problem, i.e., L. This allows keeping the overall complexity equal to the multiplication by $Q_{1:L,1:L}^{-1}$. These considerations are useful to understand the fundaments of the joint CE and CLE embodiment described in the remainder of this document.

The LD algorithm allows avoiding memory storage of all the L possible matrices Q, thanks to their Toeplitz structure; it is enough to store one row of the Q matrix (elements from 1 to L). Indeed, the only operation involving Q is equation (29). Thus, just the last row of Q suffices:

$$\varepsilon_y^{(l)} = Q_{L,1:l-1} y^{(l-1)} = Q_{L,(L-l+1):L-1} y^{(l-1)} \quad (39)$$

or, equivalently, if Q is Hermitian, it is sufficient to retain the first row:

$$\varepsilon_y^{(l)} = (Q_{1,2:l})^* R y^{(l-1)} \quad (40)$$

Figure 3:
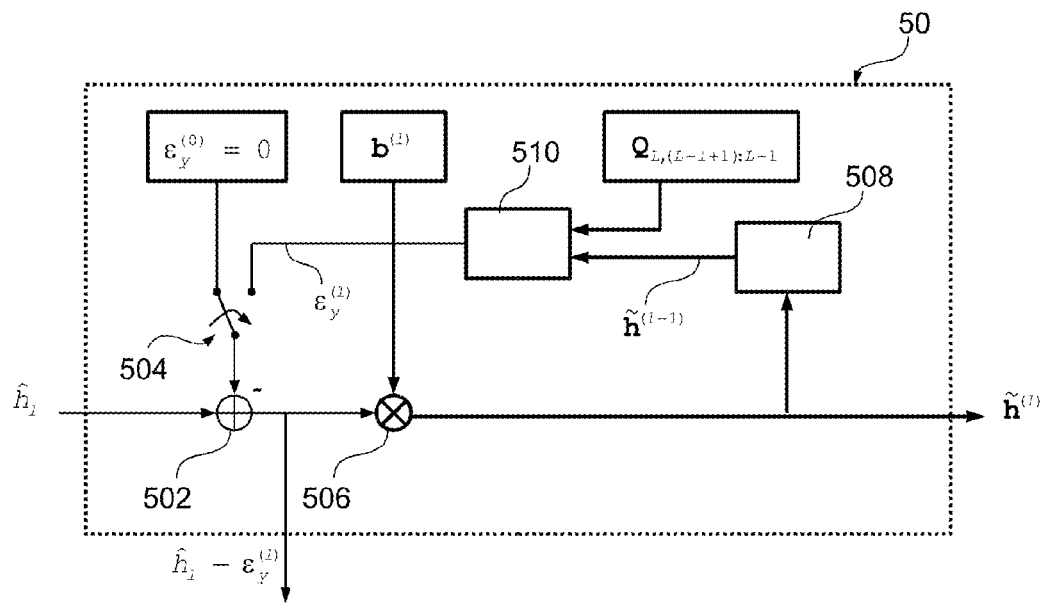

For example, FIG. 3 shows an embodiment of an LD updater circuit 50, which performs the core operation of the LD algorithm as shown, e.g., in equation (31), i.e., the update of the estimation $y^{(l)}$ at l-th step, on the basis of the one at l–1 step, the l-th vector $b^{(l)}$ and the error term at l-th step.

Specifically, in the embodiment considered, the block 50 receives as input the current channel estimate $\hat{h}_l$. Specifically, this channel estimate $\hat{h}_l$ is provided to a subtraction block 502 in order to calculate:

$$\hat{h}_l - \varepsilon_y^{(l)}$$

Specifically, in the embodiment considered, the error $\varepsilon_y^{0}$ is set to 0 for the first cycle, and the then updated errors $\varepsilon_y^{(l)}$ according to equation (39) are used. For example, in the embodiment considered, a switch 504 is used to select between the initial error $\varepsilon_y^{(0)}=0$ and the subsequent errors $\varepsilon_y^{(l)}$.

In the embodiment considered, the result of the subtraction at block 502 is provided to a multiplier 506 in order to compute the updated channel estimates $\tilde{h}^{(l)}$ at the l-th step:

$$\tilde{h}^{(l)} = \begin{bmatrix} \tilde{h}^{(l-1)} \\ 0 \end{bmatrix} + (\hat{h}_l - \varepsilon_y^{(l)}) b^{(l)}$$

In the embodiment considered, the updated channel estimates $\tilde{h}^{(l)}$ at the l-th step are then stored in a memory 508 to provide the results $\tilde{h}^{(l-1)}$ for the next cycle, which may be used to compute at a block 510 the errors according to equations (29) and (39):

$$\varepsilon_y^{(l)} = Q_{L,(L-l+1):L-1} \tilde{h}^{(l-1)}$$

Accordingly, the embodiment shown in FIG. 3 uses a fixed matrix Q, as shown, e.g., in equation (15), and accordingly the vectors $b^{(l)}$ may be pre-computed.

Accordingly, in the embodiment considered, the update of the channel-impulse-response vector in the time domain $\tilde{h}$ is performed by calculating recursively for each tap l a respective updated channel-impulse-response vector $\tilde{h}^{(l)}$ as a function of the updated channel-impulse-response vector $\tilde{h}^{(l-1)}$ at the $(l-1)^{th}$ tap, the channel impulse response at the l-th tap $\hat{h}_l$, an error term $\varepsilon_y^{(l)}$ determined as a function of the matrix Q and the updated channel impulse response vector $\tilde{h}^{(l-1)}$ at the (l–1)-th tap, and a backward vector $b^{(l)}$ at the l-th tap determined as a function of said matrix Q.

Figure 4:
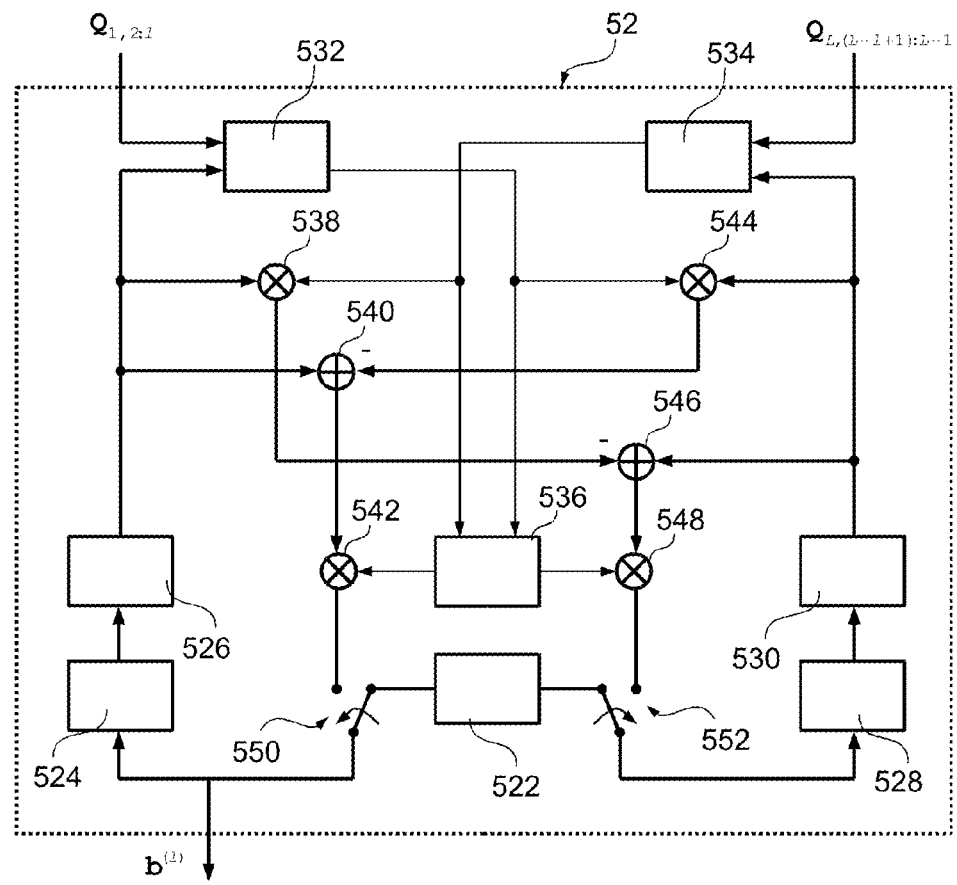

FIG. 4 shows in this context an embodiment of a block 52, which may be used in combination with the core block 50, to compute the vector $b^{(l)}$ for a general matrix Q (real or complex, symmetrical/Hermetian or not). Specifically, the computation of the backward vector $b^{(l)}$ is done before updating the estimate $y^{(l)} = \tilde{h}^{(l)}$.

In the embodiment considered, the block 52 includes a block 522, which provides the initial value for the vectors $b^{(1)}$ and $f^{(1)}$. For example, in the embodiment considered, the vectors at the instant l=1 are provided via respective switches 550 and 552, and are set as follows:

$$b^{(1)} = f^{(1)} = 1/Q_{1,1}$$

The backward vector at the instant l is then stored in a memory 524 and expanded at a block 526 to provide the vector:

$$\begin{bmatrix} 0 \\ b^{(l-1)} \end{bmatrix}.$$

Similarly, the forward vector at the instant l is stored in a memory 528 and expanded at a block 530 in order to provide the vector:

$$\begin{bmatrix} f^{(l-1)} \\ 0 \end{bmatrix}.$$

The delayed vectors at the output of the memories 524 and 528, or the expanded versions thereof, may be used to compute, at blocks 532 and 534, the errors $\epsilon_b^{(l)}$ and $\epsilon_f^{(l)}$ as per equations (34) and (35), i.e.:

$$\epsilon_b^{(l)} = Q_{1,2:l} b^{(l-1)}$$

$$\epsilon_f^{(l)} = Q_{l,1:l-1} f^{(l-1)} = Q_{L,(L-l+1):L-1} f^{(l-1)}.$$

In the embodiment considered, these errors $\epsilon_b^{(l)}$ and $\epsilon_f^{(l)}$ are provided to a block 536 for computing:

$$\frac{\epsilon_b^{(l)}}{1 - \epsilon_b^{(l)} \epsilon_f^{(l)}}.$$

In the embodiment considered, the expanded backward vector at the output of the block 526 is multiplied at a block 538 with the error $\epsilon_f^{(l)}$ to calculate:

$$\epsilon_f^{(l)} \begin{bmatrix} 0 \\ b^{(l-1)} \end{bmatrix}$$

and the expanded forward vector at the output of the block 530 is multiplied at a block 544 with the error $\epsilon_b^{(l)}$ to calculate:

$$\epsilon_b^{(l)} \begin{bmatrix} f^{(l-1)} \\ 0 \end{bmatrix}$$

The vector at the output of the multiplier 544 is then subtracted at a block 540 from the expanded backward vector to compute:

$$\begin{bmatrix} 0 \\ b^{(l-1)} \end{bmatrix} - \epsilon_b^{(l)} \begin{bmatrix} f^{(l-1)} \\ 0 \end{bmatrix}.$$

Similarly, the vector at the output of the multiplier 538 is subtracted at a block 546 from the expanded forward vector in order to compute:

$$\begin{bmatrix} f^{(l-1)} \\ 0 \end{bmatrix} - \epsilon_f^{(l)} \begin{bmatrix} 0 \\ b^{(l-1)} \end{bmatrix}.$$

Finally, the vectors at the outputs of the blocks 540 and 546 are multiplied at respective multipliers 542 and 548 with the term computed by the block 536 to compute the updated vectors $b^{(l)}$ and $f^{(l)}$ at the instant l:

$$b^{(l)} = \frac{1}{1 - \epsilon_b^{(l)} \epsilon_f^{(l)}} \begin{bmatrix} 0 \\ b^{(l-1)} \end{bmatrix} - \frac{\epsilon_b^{(l)}}{1 - \epsilon_b^{(l)} \epsilon_f^{(l)}} \begin{bmatrix} f^{(l-1)} \\ 0 \end{bmatrix}$$

$$f^{(l)} = \frac{1}{1 - \epsilon_b^{(l)} \epsilon_f^{(l)}} \begin{bmatrix} f^{(l-1)} \\ 0 \end{bmatrix} - \frac{\epsilon_f^{(l)}}{1 - \epsilon_b^{(l)} \epsilon_f^{(l)}} \begin{bmatrix} 0 \\ b^{(l-1)} \end{bmatrix}$$

Accordingly, the block 52 determines the backward vector $b^{(l)}$ at the l-th tap as a function of the backward vector $b^{(l-1)}$ at the (l−1)-th tap, a forward vector $f^{(l-1)}$ at the (l−1)-th tap, and error terms $\epsilon_b^{(l)}$, $\epsilon_f^{(l)}$, determined as a function of said backward vector $b^{(l-1)}$ at the (l−1)-th tap, the forward vector $f^{(l-1)}$ at the (l−1)-th tap, and the matrix Q.

AIC Implementation

In an embodiment, which generally may be used in any channel estimator, also the "AIC penalty" is computed via a new metric expression that does not require the computation of a logarithm; this new metric expression is a variant of the Corrected AIC [8], or AICc, an unbiased version of the AIC criterion. Therefore, most or all of the results presented in the following the description are valid for either the AIC or the AICc reference criteria.

Specifically, an embodiment deals with avoiding the computation of virtual carriers.

Specifically, AIC criterion can be generalized by expressing it through a Residual Sum of Squares (log-RSS), as in [7]. On that basis, it can be proved that the contribution due to the virtual carriers is a constant factor, which may be expressed by the novel mathematical formula:

$$\tilde{h}_{l \times 1} = \qquad (41)$$

$$\max_{h_{l \times 1}} \frac{1}{(\pi N_0)^N} \exp\left(-\frac{1}{N_0} \left\| A W^H r_{N \times 1} - P W^H \begin{bmatrix} I_{l \times l} \\ 0_{(N-l) \times l} \end{bmatrix} h_{l \times 1} \right\|^2 \right) \cdot$$

$$\exp\left(-\frac{1}{N_0} \|(I - A) W^H r_{N \times 1}\|^2\right)$$

As a consequence, equation (23) may be written as:

$$\sigma_l^2(i) = \sum_{k: p_k > 0} \left| \tilde{h}_k^{(l)(f)} - \frac{r_k^{(f)}(i)}{p_k} \right|^2 \qquad (42)$$

where the term $p_k > 0$ refers to just the K active tones. It follows that a new "log-RSS" expression for the AIC metric can be derived using equations (41) and (42) with reference to PACE using M OFDM training symbols:

$$AIC(l) = \ln\left(\frac{1}{M} \sum_{i=1}^{M} \sigma_l^2(i)\right) + \Psi_l, \qquad (43)$$

$$\Psi_l = \frac{2}{K} l$$

The AIC penalty term (2/K)·l differentiates from the one in equation (22) as it does not take into account the contribution of the virtual carriers. Specifically in case of [1], M=2 and $\sigma_0^2(1)$ and $\sigma_0^2(2)$ are the metrics computed over the LTF$_1$ and LTF$_2$ tones respectively, for l=0; K=52 is the number of used tones (data and pilots) and then $\Psi_l$=0.03851.

Moreover, in case of DACE, M=1 and equation (43) reduces to:

$$AIC(l) = \ln \sigma_l^2 + \frac{2}{K}l \qquad (44)$$

The AIC criterion is unbiased only asymptotically for a large number of observations. As mentioned in the foregoing, an alternative solution is to employ the AICc. The distinctive feature of AICc is to use a penalty term leading to unbiased CLE, also for a small number of observations. Similarly to AIC in equation (21), AICc is also used for the purpose of CLE in the minimization problem:

$$\hat{l} = \arg\min_{1 \leq l \leq L_{cp}+1} AICc(l) \qquad (45)$$

Accordingly, the channel length estimate $\hat{l}$ is computed for a given maximum number of L taps by determining the channel length $\hat{l}$, which minimizes an Akaike information criterion metric determined as a function of the square-norm $\sigma_l^2$ of the channel-impulse-response vector in the time domain $\hat{h}$.

Specifically, in the embodiment considered, the Akaike information criterion metric does not take into account unused Orthogonal Frequency Division Multiplexing sub-carriers by determining an additive penalty term $\Psi_l$ depending on the number K of used OFDM sub-carriers and the channel length l, and using the metrics (43) or (44) for a Pilot Assisted Channel Estimation including M pilot symbols or for a Data Aided Channel Estimation respectively, where the penalty term $\Psi_l$ may be calculated according to equation (43).

In an embodiment, AICc is used in combination with virtual-carriers computation avoidance, leading to the following mathematical formulation:

$$AICc(l) = \ln \sigma_l^2 + \Psi_l \qquad (46)$$

where the penalty term $\Psi_l$ may assume at least two alternative expressions:

$$\Psi_l = \frac{2}{n}p\left(1 + \frac{p+1}{n-p-1}\right) = \frac{2l}{K-l-0.5} \qquad (47)$$

or $$\Psi_l = \frac{n+p}{n-p-2} = \frac{K+l}{K-l-1} \qquad (48)$$

where p=2 l and n=2K.

Specifically, equation (46), and equation (47) or equation (48), are valid for both PACE and DACE. Accordingly, the use of such values for $\Psi_l$ allows avoiding the need to compute $$\frac{1}{M}\sum_{i=1}^{M} \sigma_l^2(i)$$

but a single value $\sigma_l^2$ can be used instead even in case of PACE with M≥2 OFDM training symbols.

Accordingly, in the embodiment considered, a compact Akaike information criterion metric is used which does not take into account unused Orthogonal Frequency Division Multiplexing sub-carriers by determining an additive penalty term $\Psi_l$ depending on the number K of used OFDM sub-carriers and the channel length l, and using the metric (46) (for a Pilot Assisted Channel Estimation comprising M pilot symbols and/or for a Data Aided Channel Estimation), where the penalty term $\Psi_l$ may be calculated according to equation (47) or (48).

In an embodiment, to achieve better results in case of PACE, equation (23) or (42) can be computed using as input $\tilde{h}_k^{(l)(i)}$ representing the k-th element of the DFT of $\tilde{h}_{ave}$ defined as the average of the M l-tap CIRs $\tilde{h}^{(l)}(i)$ corresponding to the i-th training sequence:

$$\tilde{h}_{ave} = \frac{1}{M}\sum_{i=1}^{M} \tilde{h}(i) \qquad (49)$$

The above average is usually also accomplished by standard channel estimators, thus no extra complexity is required.

AIC and AICc are special cases of a more comprehensive Generalized-AIC (GAIC) class of selection criteria. GAIC criteria differ in their penalty-term expressions.

Accordingly, even though the present description deals primarily with AIC, i.e., equation (43) (or (44)), and AICc, i.e., equation (46) with equation (47) or (48), criteria respectively, it is understood that other Generalized-AIC additive penalty terms may be used without limiting the generality of the present disclosure.

For example, an embodiment deals with a novel CLE arrangement, which allows efficient hardware implementation of the AIC or AICc metric computation.

For example, in an embodiment, the AIC or AICc equations shown in the foregoing are approximated with their exponential expressions, both in PACE and DACE contexts, thus avoiding logarithm calculation. In such cases, the CL estimate $\hat{l}$ is the result of:

$$\hat{l} = \arg\min_{1 \leq l \leq L_{cp}+1} AIC_{exp}(l) = \arg\min_{1 \leq l \leq L_{cp}+1} \exp[AIC(l)] \qquad (50)$$

or $$\hat{l} = \arg\min_{1 \leq l \leq L_{cp}+1} AICc_{exp}(l) = \arg\min_{1 \leq l \leq L_{cp}+1} \exp[AICc(l)] \qquad (51)$$

Accordingly, the Akaike information criterion metric is approximated with its exponential expression and the result $\hat{l}$ is a close approximation to equation (21) or (45) respectively, as they may differ slightly because l takes a value out of a discrete-integer set.

In an embodiment, the general expression for $AIC_{exp}(l)$ in case of PACE with M training symbols is given by:

$$AIC_{exp}(l) = \frac{1}{M}\sum_{i=1}^{M}\sigma_l^2(i)\exp\Psi_l = \frac{1}{M}\sum_{i=1}^{M}\sigma_l^2(i)v_l \qquad (52)$$

while for DACE it reduces to:

$$AIC_{exp}(l) = \sigma_l^2 \exp \Psi_l = \sigma_l^2 v_l \qquad (53)$$

In an embodiment, the exponential versions of equations (43) and (44) can be considered:

$$AIC_{exp}(l) = \frac{1}{M}\sum_{i=1}^{M} \sigma_l^2(i) v_l = \frac{1}{M}\sum_{i=1}^{M} \sigma_l^2(i) \exp\left(\frac{2}{K}l\right) \quad (54)$$

or $$AIC_{exp}(l) = \sigma_l^2 v_l = \sigma_l^2 \exp\left(\frac{2}{K}l\right) \quad (55)$$

Similarly, in an embodiment, the general expression for $AICc_{exp}(l)$ is given by:

$$AICc_{exp}(l) = \sigma_l^2 \exp \Psi_l = \sigma_l^2 v_l \quad (56)$$

with specializations given by the exponential versions of equations (47) and (48):

$$AICc_{exp}(l) = \sigma_1^2 v_1 = \sigma_1^2 \exp\frac{2l}{K-l-0.5} \quad (57)$$

and $$AICc_{exp}(l) = \sigma_1^2 v_1 = \sigma_1^2 \exp\frac{K\_l}{K-l-1} \quad (58)$$

In an embodiment, in all cases the AICc/AIC additive penalty coefficients $\Psi_l$ are replaced by the correction factors $v_l = \exp \Psi_l$.

Joint CE and CLE Using LD and AIC/AICc Criterion

As mentioned in the foregoing, the disclosed CE and CLE may be used independently. However, an embodiment concerns also a method for joint CE and CLE, attaining high performance and at the same time minimizing the number of computations and memory usages.

Specifically, an embodiment concerns an efficient method for the TD computation and recursive updating operation of the term $$\frac{1}{M}\sum_{i=1}^{M} \sigma_1^2(i) \text{ or } \sigma_1^2$$

used, e.g., in equations (43), (44), (46), (52), (53), (54), (55), (56), (57), and (58).

Specifically, an embodiment reuses the outputs of the recursive LD algorithm applied to RR TD LS CE. In fact, time-domain computations are appealing as the computation of the following terms can be avoided compared to the baseline joint CL and CLE algorithm based on AIC:

a) the DFT of all the intermediate CIR estimates $\tilde{h}^{(l)}$ with $l=1, \ldots L_{cp}+1$;

b) M·N Euclidean distance (ED) metrics with complex inputs, for each l with $l=1, \ldots, L_{cp}+1$ (with M being the number of OFDM training sequences). For example, for AICc, M=1 for both PACE and DACE applied to OFDM systems [1], and for AIC criterion, M=1 for DACE and M=2 for PACE.

Instead, according to an embodiment, the ED metrics are computed as a whole only once (for l=0) and then updated recursively at each step ($l=1, \ldots, L_{cp}+1$) of the recursive LD algorithm applied to RR TD LS CE. Such M·K ED metrics can be determined during an initialization or setup stage of the joint CL and CLE algorithm.

For example, in case of uniform-power pilots and sub-optimal FD ZF CE, $$\frac{1}{M}\sum_{i=1}^{M} \sigma_1^2(i)$$

may be computed as follows:

$$\frac{1}{M}\sum_{i=1}^{M} \sigma_1^2(i) = \frac{1}{M}\sum_{i=1}^{M} \left\| A\left(W^H \begin{bmatrix} \tilde{h}^{(l)} \\ 0_{(N-l)\times 1} \end{bmatrix} - \bar{P}W^H r(i)\right) \right\|^2 \quad (59)$$

$$= \underbrace{\frac{1}{M}\sum_{i=1}^{M} \|\hat{h}(i)\|^2 - (\tilde{h}^{(l)})^H \hat{h}_{1:l}}_{\sigma_0^2}$$

or, in case of (optimal) TD LS CE, $$\frac{1}{M}\sum_{i=1}^{M} \sigma_1^2(i) = \frac{1}{M}\sum_{i=1}^{M} \left\| PW^H \begin{bmatrix} \tilde{h}^{(l)} \\ 0_{(N-l)\times 1} \end{bmatrix} - AW^H r(i) \right\|^2 \quad (60)$$

$$= \underbrace{\frac{1}{M}\sum_{i=1}^{M} \|AW^H r(i)\|^2 - (\tilde{h}^{(l)})^H \hat{h}_{1:l}}_{\sigma_0^2}$$

Accordingly, the initial values may be:

$$\sigma_0^2 = \frac{1}{M}\sum_{i=1}^{M} \|\hat{h}(i)\|^2$$

and $$\sigma_0^2 = \frac{1}{M}\sum_{i=1}^{M} \|AW^H r(i)\|^2$$

Figure 5:
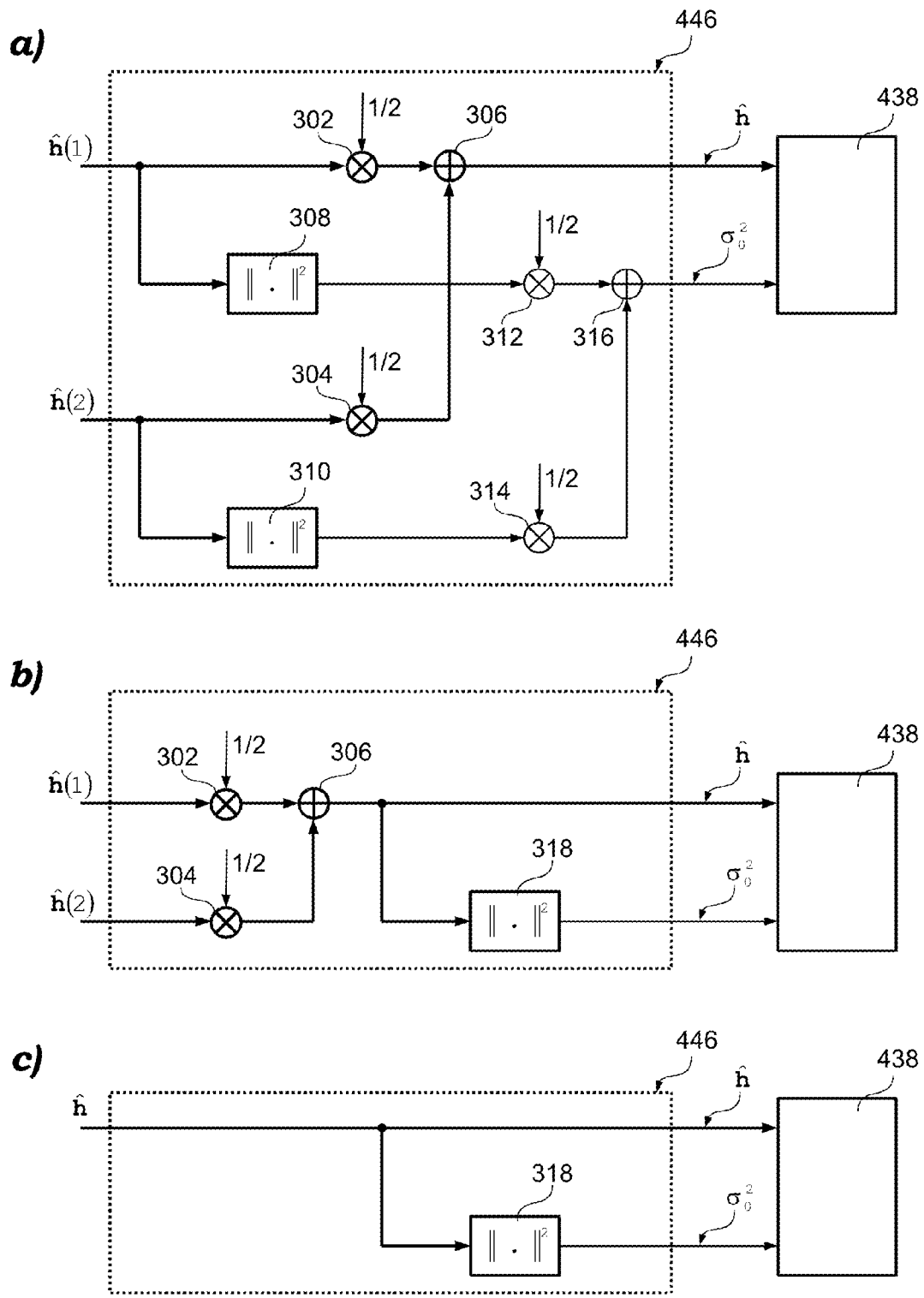

For example the former is shown in FIG. 5a and applied to PACE OFDM systems [1].

Conversely, for l>0, the initial value $\sigma_0^2$ is updated step by step yielding $\sigma_l^2$ for $l=1, \ldots, L_{cp}+1$.

For example, in case of uniform-power pilots and sub-optimal FD ZF CE, a single $\sigma_l^2$ may be computed as follows:

$$\sigma_1^2 = \left\| A\left(W^H \begin{bmatrix} \tilde{h}^{(l)} \\ 0_{(N-l)\times 1} \end{bmatrix} - \bar{P}W^H r\right) \right\|^2 = \underbrace{\|\hat{h}\|^2 - (\tilde{h}^{(l)})^H \hat{h}_{1:l}}_{\sigma_0^2} \quad (61)$$

or, in case of (optimal) LS CE:

$$\sigma_1^2 = \left\| PW^H \begin{bmatrix} \tilde{h}^{(l)} \\ 0_{(N-l)\times 1} \end{bmatrix} - AW^H r \right\|^2 = \underbrace{\|AW^H r\|^2 - (\tilde{h}^{(l)})^H \hat{h}_{1:l}}_{\sigma_0^2} \quad (62)$$

Accordingly, the initial values may be:

$$\sigma_0^2 = \|\hat{h}\|^2 = \sum_{k=0}^{N-1} |\hat{h}_k|^2$$

and $$\sigma_0^2 = \|AW^H r\|^2 = \sum_{k||p_k|>0} |r_k^{(f)}|^2$$

For example, the former is shown in FIGS. 5b and 5c and applied to PACE and DACE OFDM systems [1], respectively.

Specifically, as mentioned in the foregoing, FIGS. 5a to 5c show possible setup-configurations and concern the computation of $\sigma_l^2$ when l=0.

In the embodiments considered, the inputs of the block 446 are N×1 vectors, where N is the OFDM symbol length. Moreover, in the embodiments considered, the setup-up blocks 446 shown in FIGS. 5a to 5c include blocks denoted as $\|\cdot\|^2$, which perform a square-norm computation, i.e., the block $\|\cdot\|^2$ computes for an input vector $x=[x_1, x_2, \ldots, x_n]^T$ the following equation:

$$\|x\| = |x_1|^2 + |x_2|^2 + \ldots + |x_n|^2$$

For example, the embodiment shown in FIG. 5a may be used in PACE schemes and CLE based on AIC or $AIC_{exp}$ criterion, in which two input vectors $\hat{h}(1)$ and $\hat{h}(2)$ are provided to the block 446. For example, these input vectors may be derived from the first and second long training field $LTF_1$ and $LTF_2$.

Specifically, in the embodiment considered, the input vectors $\hat{h}(1)$ and $\hat{h}(2)$ are provided to respective multipliers 302 and 304 for calculating the terms $\hat{h}(1)/2$ and $\hat{h}(2)/2$. These terms are then summed at an adder 306 to calculate the channel estimate, e.g., according to equation (18), i.e.:

$$\hat{h} = \frac{\hat{h}(1) + \hat{h}(2)}{2}.$$

Moreover, in case of AIC or AICexp CLE criterion, the input vectors $\hat{h}(1)$ and $\hat{h}(2)$ are provided to respective blocks 308 and 310 for calculating the terms $\sigma_0^2(1) = \|\hat{h}(1)\|^2$ and $\sigma_0^2(2) = \|\hat{h}(2)\|^2$. These terms are provided to respective multipliers 312 and 314 and the results are summed at an adder 316 to calculate the parameter $\sigma_0^2$ as follows:

$$\sigma_0^2 = \frac{\sigma_0^2(1) + \sigma_0^2(2)}{2}.$$

The embodiment shown in FIG. 5b may be used in PACE schemes and CLE based on AICc or $AICc_{exp}$ criterion, in which two input vectors $\hat{h}(1)$ and $\hat{h}(2)$ are provided to the block 446. In the embodiment considered, the channel estimate $\hat{h}$ is calculated as in FIG. 5a using the blocks 302, 304, and 306. However the parameter $\sigma_0^2$ is calculated differently. Specifically, in the embodiment considered, only a block 318 is used to calculate the square-norm $\sigma_0^2$ over input vector $\hat{h}$: $\sigma_0^2 = \|\hat{h}\|^2$.

The embodiment shown in FIG. 5c may be used in DACE schemes and CLE based on AIC or AICc and $AIC_{exp}$ or $AICc_{exp}$ criterion. Specifically, in DACE schemes typically is provided only a single channel estimate $\hat{h}$, and accordingly, only a block 318 may be used to calculate the square-norm $\sigma_0^2$ over input vector $\hat{h}$: $\sigma_0^2 = \|\hat{h}\|^2$.

The computation of $\sigma l^2$ may be performed recursively starting from $\sigma_{l-1}^2$ and using equation (61) (or (62)). Similarly, this holds for their average $$\frac{1}{M} \sum_{i=1}^{M} \sigma_i^2(i)$$

for M>1, starting from $$\frac{1}{M} \sum_{i=1}^{M} \sigma_{l-1}^2(i)$$

and using equation (59) (or (60)).

Figure 6:
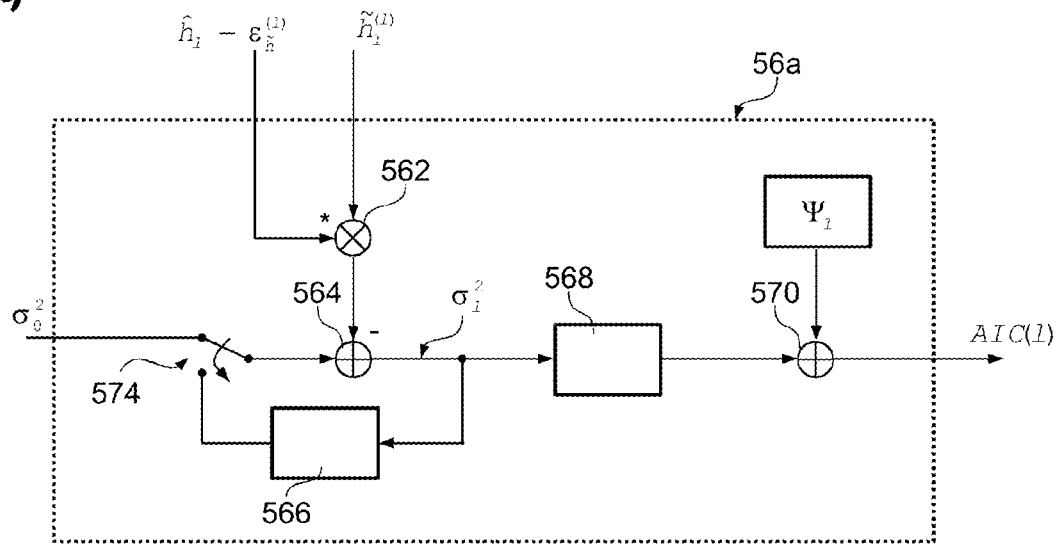
Figure 6:
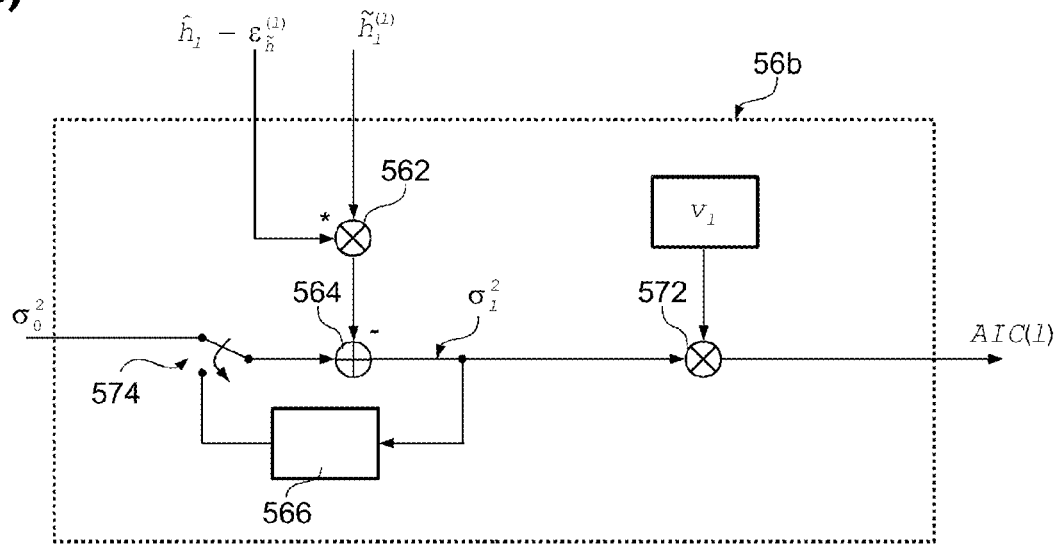

The core of the operation is the recursive update of the term $(\tilde{h}^{(l)})^H \hat{h}_{1:l}$ of equations (59)-(62), represented by the block 56a in FIG. 6a for the case of AIC (or AICc) and block 56b in FIG. 6b for the case of $AIC_{exp}$ (or $AICc_{exp}$).

Specifically, this operation may be performed by exploiting at each step the outputs of the LD algorithm applied, e.g., by block 50, to RR TD LS CE and results in:

$$(\tilde{h}^{(l)})^H \hat{h}_{1:l} = \left( \begin{bmatrix} \tilde{h}^{(l-1)} \\ 0 \end{bmatrix} + (\hat{h}_l + \varepsilon_{\hat{h}}^{(l)}) b^{(l)} \right)^H \hat{h}_{1:l} \qquad (63)$$

$$= (\tilde{h}^{(l-1)})^H \hat{h}_{1:(l-1)} + (\hat{h}_l - \varepsilon_{\hat{h}}^{(l)})^* \tilde{h}_1^{(l)}$$

where $\hat{h}_l$ denote the l-th input TD tap of the CIR to be smoothed and $\tilde{h}^{(l)}$ is the l-tap RR TD LS CIR, computed up to the l-th step of the algorithm. Specifically, equation (63) derives from equation (31), where $x_l$ and $y^{(l)}$ have been replaced by $\hat{h}_l$ and $\tilde{h}^{(l)}$, respectively. The same equation holds for both cases of uniform and non-uniform power pilots.

For example, the embodiment shown in FIG. 6a implements the recursive updating operations of equations (59) to (63) of the AIC metrics of equations (43) or (44), or the AICc metric of equation (46), also using the pre-calculated additive terms $\Psi_l$.

In the embodiment considered, the block 56a includes a multiplier 562, which receives, e.g., from the block 50 (FIG. 3), the terms $\hat{h}_l - \varepsilon_{\hat{h}}^{(l)}$ and $\tilde{h}_l^{(l)}$. For example, the term $\hat{h}_l - \varepsilon_{\hat{h}}^{(l)}$ is directly available at the output of the block 502 (FIG. 3), while the term $\tilde{h}_l^{(l)}$ may be extracted from the output vector $\tilde{h}^{(l)}$ of the block 50, i.e., the output at the multiplier 506 (FIG. 3).

These terms may then be combined at a multiplier 562, which also performs a conjugate operation, in order to calculate the term:

$$(\hat{h}_l - \varepsilon_{\hat{h}}^{(l)})^* \tilde{h}_l^{(l)}$$

Specifically, at the first instant l=1, the output at the multiplier 562 may then be subtracted at a block 564 from the square-norm $\sigma_0^2$ $$\sigma_1^2 = \sigma_0^2 - (\tilde{h}^{(1)})^H \hat{h}_{1:1} = \sigma_0^2 - (\hat{h}_1 - \varepsilon_{\hat{h}}^{(1)})^* \tilde{h}_1^{(1)}$$

This value is then stored in a memory 566 for the next cycle l. Specifically, in the embodiment considered, during the next cycle, the value stored in the memory is selected (e.g., via a switch 574) as input of the block 564, and accordingly:

$$\sigma_2^2 = \sigma_1^2 - (\hat{h}_2 - \varepsilon_{\hat{h}}^{(2)})^* \tilde{h}_2^{(2)}$$
$$= \sigma_0^2 - (\hat{h}_1 - \varepsilon_{\hat{h}}^{(1)})^* \tilde{h}_1^{(1)} - (\hat{h}_2 - \varepsilon_{\hat{h}}^{(2)})^* \tilde{h}_2^{(2)}$$
$$= \sigma_0^2 - [(\hat{h}_1 - \varepsilon_{\hat{h}}^{(1)})^* \tilde{h}_1^{(1)} - (\hat{h}_2 - \varepsilon_{\hat{h}}^{(2)})^* \tilde{h}_2^{(2)}]$$
$$= \sigma_0^2 - (\tilde{h}^{(2)})^H \hat{h}_{1:2}$$

Accordingly, generally the output of the block 564 calculates iteratively equation (61) or (62), which thus applies also to equation (59) or (60):

$$\sigma_l^2 = \sigma_0^2 - (\tilde{h}^{(l)})^H \hat{h}_{1:l}$$

Accordingly, the Akaike information criterion metric is determined by calculating for each tap the square-norm $\sigma_l^2$ (which generally represents also the average square-norm in equations (59) or (60)) at the l-th tap recursively as a function of the square-norm $\sigma_{l-1}^2$ at the (l−1)-th tap, the updated channel impulse response at the l-th tap $\tilde{h}_l$, the channel impulse response at the l-th tap $\hat{h}_l$ and the error term $\varepsilon_y^{(l)}$ (also referred to as $\varepsilon_{\hat{h}}^{(l)}$).

For example, in an embodiment, CE is performed through the AIC or AICc criterion and the criterion is calculated as:

$$AIC(l) = \ln \sigma_l^2 + \Psi_l$$

For example, in the embodiment considered, the output of the block 564, i.e., $\sigma_l^2$, is provided to a block 568 for calculating the logarithm of $\sigma_l^2$, and the result is provided together with the AIC additive penalty terms "$\Psi_l$" to an adder 570 for calculating the AIC metric:

$$AIC(l) = \ln \sigma_l^2 + \Psi_l$$

In the embodiment considered, the AIC additive penalty terms "$\Psi_l$" may be stored in memory.

Conversely, FIG. 6b shows a block 56b which implements the recursive updating operations of equations (59) to (63) of the $AIC_{exp}$ or $AICc_{exp}$ metrics (52) to (58), also using the pre-calculated penalty factor $v_l$. For example these AIC penalty factors "$v_l$" may be stored in a memory.

Specifically, the embodiment considered corresponds substantially to the embodiment described with respect to FIG. 6a, i.e., the term $\sigma_l^2$ is calculated iteratively via blocks 562, 564, 566, and 574.

However, in this embodiment, the term $\sigma_l^2$ is provided together with the AIC additive penalty terms "$v_l$" to a multiplier 572 for calculating the AIC metric:

$$AIC(l) = \sigma_l^2 v_l$$

An embodiment concerns the joint determination of CE and CLE.

The minimization of either the AIC(l) or AICc(l) ($AIC_{exp}$(l) or $AICC_{exp}$(l), as well) metric provides a selection criterion of the estimated CIR and associated CL estimate $\hat{l}$ out of $L=L_{cp}+1$ l-tap partial CIR candidate estimates, associated to the corresponding CLs l=1, ..., $L_{cp}$+1.

Figure 7:
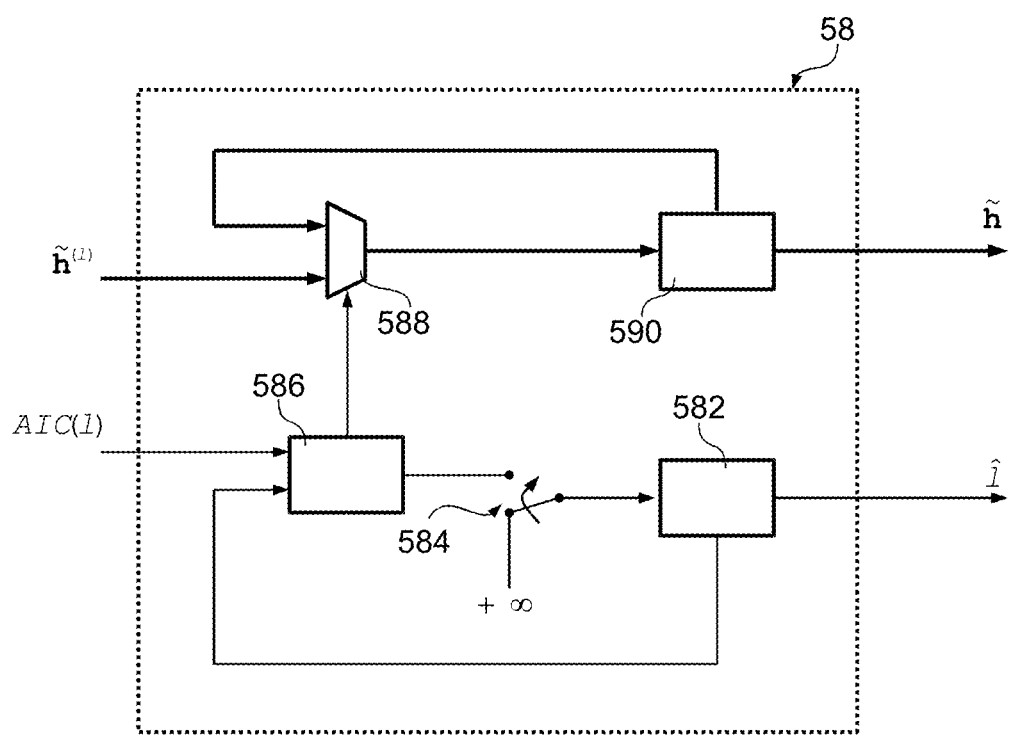

FIG. 7 shows in that respect a possible embodiment of such a CIR/CL selector 58 configured for selecting the output CIR and its associated CL estimate, which minimizes the AIC metrics out of L computed partial CIRs with l=1, ..., L, as for equations (50) (or (51))

In the embodiment considered, the selector 58 includes a memory 582 for storing the partial minimum AIC(l) or AICc (l) ($AIC_{exp}$(l) or $AICc_{exp}$(l), as well) metrics determined as far as the computation of the L algorithm steps progress.

Specifically, in the embodiment considered, the term $AIC_{min}$ is initialized to the maximum value that can be represented with the available bits, e.g. $AIC_{min}$=+∞ for l=0. For example, in the embodiment considered, this initialization is performed via a switch 584, which selects as an initial value for l=0 the maximum value (+∞).

The partial minimum $AIC_{min}$ is provided to a selector block 586, which selects the minimum value between the current partial minimum $AIC_{min}$ and the current AIC metric AIC(l) provided, e.g., by the block 56a (FIG. 6a) or 56b (FIG. 6b).

The new partial minimum value is then stored again in the memory 582, e.g., by coupling the selector 586 to the memory 582 via the switch 584.

Accordingly, in the embodiment considered, the memory 582 contains, for each instant, the currently smallest value of AIC(l), and, consequently at the end of the processing, this memory contains the CLE $\hat{l}$ as shown, e.g., in equation (45).

Moreover, the selector 586 is also used to drive a multiplexor 588.

Specifically, in the embodiment considered, the block 58 also includes a second memory 590 for storing the partial best channel estimate $\tilde{h}$ at the instant l. In fact, in case a new minimum metric $AIC_{min}$ has been found via the selector 586, the current best channel estimate should also be updated and stored in the memory 590. Accordingly, the multiplexor 588 is configured for selecting the current best channel estimate $\tilde{h}$ if the current metric AIC(l) is greater than the current minimum metric $AIC_{min}$, and the current channel estimate at the l-th tap $\tilde{h}^{(l)}$ if the current metric AIC(l) is smaller than the current partial metric $AIC_{min}$.

Accordingly, in the embodiment considered, the memory 590 contains, for each tap, the currently best channel estimate, and, consequently at the end of the processing, the memory 590 contains the best CE $\tilde{h}$, i.e., the block 58 may select as best updated channel-impulse-response vector $\tilde{h}$ the updated channel-impulse-response vector $\tilde{h}^{(l)}$ at the l-tap, which minimizes said Akaike information criterion metric (provided, e.g., by the block 56).

Figure 8:
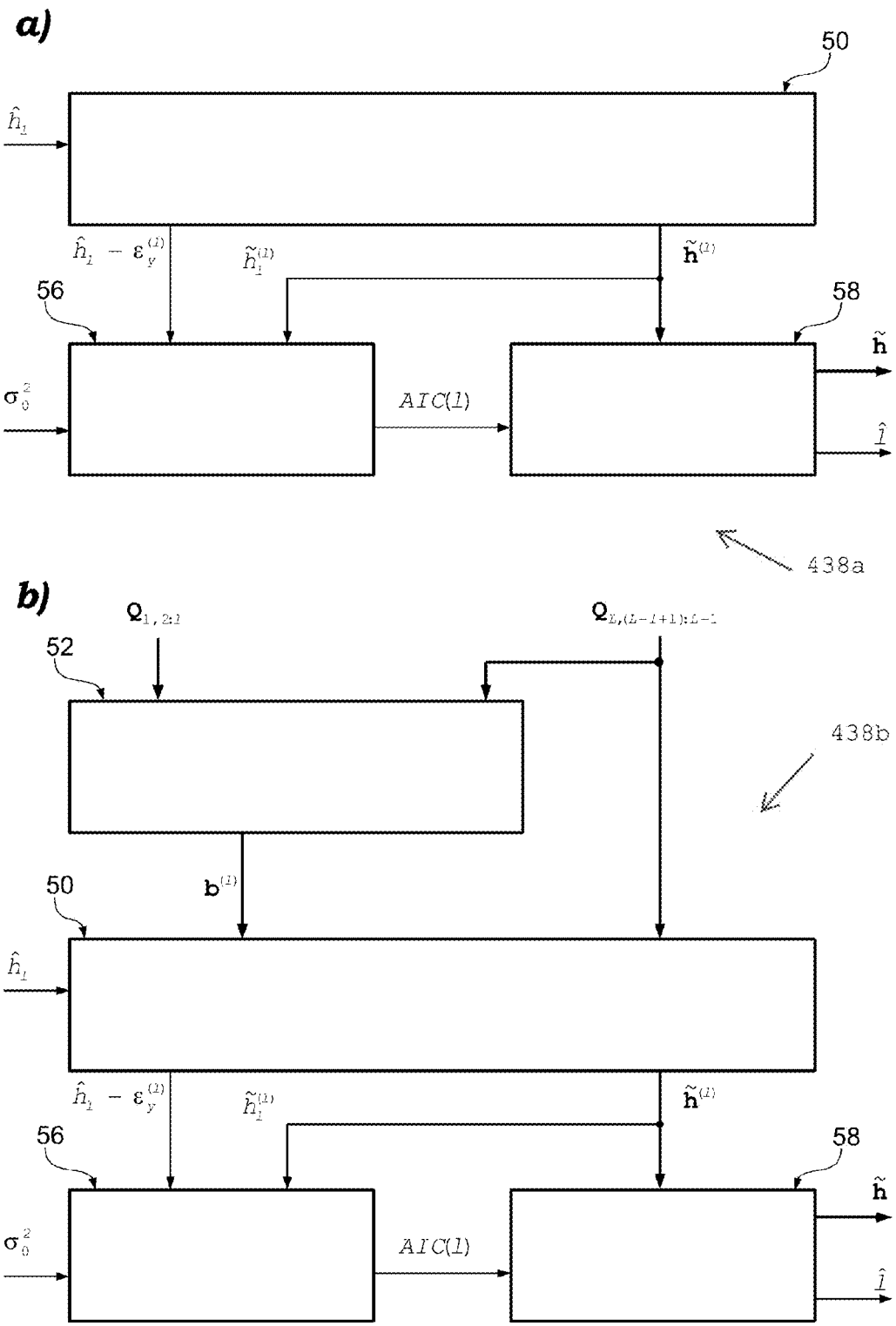

FIGS. 8a and 8b show embodiments of the complete channel estimator 438a and 438b, respectively. Specifically, the embodiment shown in FIG. 8a relates to an arrangement, wherein the matrix Q is fixed and real, while a general matrix Q may be used in the embodiment shown in FIG. 8b.

Specifically, both arrangements include an LD updater block 50 (as shown, e.g., in FIG. 3) for calculating reciprocally the channel estimates $\tilde{h}^{(l)}$, an AIC updater block 56 (as shown, e.g., in FIGS. 6a and 6b) for calculating reciprocally the AIC metric term, and a CE/CLE selector 58 (as shown, e.g., in FIG. 7) for selecting the best updated CE $\tilde{h}$ and CLE $\hat{l}$.

The primary difference between the channel estimators 438a and 438b is that the coefficients $Q_{L,(L-l+1):L-1}$ and the backward vectors $b^{(l)}$ are fixed in FIG. 8a and may be pre-computed, while in FIG. 8b an additional LD pre-processor 52 (as shown, e.g., in FIG. 4) is used for dynamically calculating the backward vectors $b^{(l)}$.

Accordingly, the AIC updater block 56 reuses values already calculated by the LD updater block 50, thus optimizing the complexity of the hardware implementation.

Moreover, the embodiments shown in FIGS. 8a and 8b may be used in combination with any of the setup blocks 446 shown in FIGS. 5a to 5c, thus permitting implementation of PACE or DACE schemes with the same hardware architecture.

Of course, without prejudice to the principles of the present disclosure, the details of construction and the embodiments may vary widely with respect to what has been described and illustrated herein purely by way of example, without thereby departing from the scope of the present disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

LIST OF REFERENCES

The following references are incorporated by reference herein:

[1] IEEE Std 802.11a-1999, "Part 11: Wireless LAN Medium Access Control (MAC) and Physical Layer (PHY) specifications: High-speed Physical Layer in the 5 GHZ Band", 1999.
[2] Y. Li and N. Seshadri and S. Ariyavisitakul. "Channel Estimation for OFDM Systems with Transmitter Diversity in Mobile Wireless Channels", IEEE Journal on Selected Areas in Communications, vol. 17, no. 3, pp. 461-471, March 1999.
[3] J. J. van de Beek, O. Edfors, and M. Sandell, "On channel estimation in OFDM systems", Proceedings of IEEE Vehicular Technology Conference, vol. 2, Chicago, Ill., July 1995, pp. 815-819.
[4] K. Witrisal, "On Estimating the RMS Delay Spread from the Frequency-Domain Level Crossing Rate", IEEE Comm. Letters, vol. 5, no. 7, pp. 287-289, July 2001.
[5] M. Jia, Z. Wang, and X. Gu, "Time domain channel and channel length estimation for OFDM system", Proceedings of IEEE Pacific Rim Conference on Communications, Computers and Signal Processing, Victoria, BC, August 2007, pp. 605-608.
[6] H. Akaike, "A New Look at the Statistical Model Identification", IEEE Transactions on Automatic Control, vol. 19, no. 6, pp. 716-723, December 1974.
[7] E. G. Larsson, G. Liu, J. Li, and G. B. Giannakis, "Joint Symbol Timing and Channel Estimate for OFDM Based WLANs", IEEE Communications Letters, vol. 5, no. 8, pp. 325-327, August 2001.
[8] Joseph E. Cavanaugh, "Unifying the Derivations for the Akaike and Corrected Akaike Information Criteria", Statistics & Probability Letters, vol. 33, no. 2, pp. 201-208, April 1997.
[9] N. Levinson. "The Wiener RMS error criterion in filter design and prediction", Journal of Mathematics and Physics, vol. 25, no. 4, pp. 261-278, 1947.
[10] L. Wang and G. A. Libert, "Combining pattern recognition techniques with Akaike's information criteria for identifying ARMA models", IEEE Transactions on Signal Processing, vol. 42, no. 6, pp. 1388-1396, June 1994.
[11] E. Dall'Anese, A. Assalini, S. Pupolin, "On Reduced rank Channel Estimation and Prediction for OFDM-based Systems", Proceedings of Wireless Personal Multimedia Communications, Jaipur, India, December 2007.
[12] E. G. Larsson, G. Liu, J. Li, and G. B. Giannakis, "Joint Symbol Timing and Channel Estimate for OFDM Based WLANs", IEEE Communications Letters, vol. 5, no. 8, pp. 325-327, August 2001.
[13] M. K. Ozdemir and H. Arslan, "Channel Estimation for Wireless OFDM Systems", IEEE Communications Surveys & Tutorials, vol. 9, no. 2, pp. 18-48, July 2007.

The invention claimed is:

1. A method, comprising:
receiving a signal over a channel having a number of paths;
generating first channel-estimation values in response to the signal;
generating each of multiple versions of second channel-estimation values in response to a respective one of the first channel-estimation values, wherein generating each of multiple versions of second channel-estimation values includes,
generating one of the versions of second channel-estimation values in response to one of the first channel-estimation values;
generating each of one or more subsequent ones of the versions of the second channel-estimation values in response to a previous version of the second channel-estimation values and a respective other one of the first channel-estimation values;
generating each of multiple path-number-determination values in response to a respective version of the second channel-estimation values; and
determining the number of paths in response to the path-number-determination values; and
wherein generating the second channel-estimation values is adaptively performed as a function of the determined number of paths.

2. The method of claim 1 wherein receiving the signal includes receiving an orthogonal-frequency-division-multiplexed signal.

3. The method of claim 1 wherein generating the first channel-estimation values includes:
generating frequency-domain channel-estimation values;
converting the frequency-domain channel-estimation values into time-domain channel-estimation values; and
setting the first channel-estimation values equal to at least some of the time-domain channel-estimation values.

4. The method of claim 1 wherein generating each of multiple path-number-determination values includes:
generating an initial value;
generating each of the path-number-determination values in response to the initial value and in response to the respective version of the second channel-estimation values.

5. The method of claim 1 wherein determining the number of paths in response to the path-number-determination values includes:
generating a respective metric in response to each path-number-determination value; and
determining the number of paths to be a number that the metrics indicate is the most likely number of paths.

6. A receiver, comprising:
a node configured to receive a signal over a channel having a number of paths;
a first unit configured to generate first channel-estimation values in response to the signal;
a second unit configured to generate each of multiple versions of second channel-estimation values in response to a respective one of the first channel-estimation values, the second unit further configured to generate one of the versions of second channel-estimation values in response to one of the first channel-estimation values and to generate each of one or more subsequent ones of the versions of the second channel-estimation values in response to a previous version of the second channel-estimation values and a respective other one of the first channel-estimation values;
a third unit configured to generate each of multiple path-number-determination values in response to a respective version of the second channel-estimation values; and a fourth unit configured to determine the number of paths in response to the path-number-determination values; and wherein the second unit is configured to generate the second channel-estimation values adaptively as a function of the determined number of paths.

7. A system, comprising:

a node configured to receive a signal over a channel having a number of paths;

a receiver coupled to the node and including
  a first unit configured to generate first channel-estimation values in response to the signal;
  a second unit configured to generate each of multiple versions of second channel-estimation values in response to a respective one of the first channel-estimation values, the second unit further configured to generate one of the versions of second channel-estimation values in response to one of the first channel-estimation values and to generate each of one or more subsequent ones of the versions of the second channel-estimation values in response to a previous version of the second channel-estimation values and a respective other one of the first channel-estimation values, and wherein the second unit is configured to generate the second channel-estimation values adaptively as a function of a determined number of paths;
  a third unit configured to generate each of multiple path-number-determination values in response to a respective version of the second channel-estimation values; and
  a fourth unit configured to determine the number of paths in response to the path-number-determination values; and a transmitter coupled to the receiver through a wireless link having the determined number of paths.

8. A non-transitory computer-readable medium storing instructions that, when executed by at least one computing machine, cause the at least one computing machine:
  to generate first channel-estimation values in response to a signal received over a channel having a number of paths;
  to generate each of multiple versions of second channel-estimation values in response to a respective one of the first channel-estimation values by generating one of the versions of second channel-estimation values in response to one of the first channel-estimation values and by generating each of one or more subsequent ones of the versions of the second channel-estimation values in response to a previous version of the second channel-estimation values and a respective other one of the first channel-estimation values, wherein the second channel-estimation values are generated adaptively as a function of a determined number of paths;
  to generate each of multiple path-number-determination values in response to a respective version of the second channel-estimation values; and
  to determine the number of paths in response to the path-number-determination values.

* * * * *